US011567253B2

(12) United States Patent
Etter et al.

(10) Patent No.: US 11,567,253 B2
(45) Date of Patent: Jan. 31, 2023

(54) PATTERNED OPTICAL RETARDERS AND METHODS FOR MAKING THEREOF

(71) Applicant: 3M INNOVATIVE PROPERTIES COMPANY, St. Paul, MN (US)

(72) Inventors: Jo A. Etter, Kirkland, WA (US); Stephen P. Maki, North St. Paul, MN (US); Michael L. Steiner, New Richmond, WI (US); James A. Phipps, River Falls, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 228 days.

(21) Appl. No.: 16/649,161

(22) PCT Filed: Oct. 24, 2018

(86) PCT No.: PCT/IB2018/058310
§ 371 (c)(1),
(2) Date: Mar. 20, 2020

(87) PCT Pub. No.: WO2019/082106
PCT Pub. Date: May 2, 2019

(65) Prior Publication Data
US 2020/0249385 A1 Aug. 6, 2020

Related U.S. Application Data

(60) Provisional application No. 62/577,817, filed on Oct. 27, 2017.

(51) Int. Cl.
*G02B 5/30* (2006.01)
*G02B 1/111* (2015.01)

(52) U.S. Cl.
CPC ............ *G02B 5/3083* (2013.01); *G02B 1/111* (2013.01)

(58) Field of Classification Search
CPC ........ G02B 5/3083; G02B 5/30; G02B 1/111; G02B 1/10; G02B 1/04; G02B 1/12;
(Continued)

(56) References Cited

U.S. PATENT DOCUMENTS 5,882,774 A 3/1999 Jonza
6,300,991 B1 10/2001 Schadt
(Continued)

FOREIGN PATENT DOCUMENTS

CN 103454712 12/2013
GB 2331812 6/1999
(Continued)

OTHER PUBLICATIONS

International Search Report for PCT International Application No. PCT/IB2018/058310, dated Mar. 19, 2019, 6 pages.

*Primary Examiner* — Stephone B Allen
*Assistant Examiner* — Adam W Booher
(74) *Attorney, Agent, or Firm* — Robert S. Moshrefzadeh

(57) ABSTRACT

A patterned optical retarder including non-overlapping first (21) and second (27) regions with respective first and second major surfaces having different RMS surface roughnesses. For substantially normally incident light over a wavelength range from about 400 nm to about 1000 nm, the optical retarder has different retardances in the respective first and second regions.

6 Claims, 25 Drawing Sheets

(58) Field of Classification Search
CPC .. G01J 1/00; G02F 1/13363; G02F 1/133638; G02F 1/133631; G03F 7/70966; B32B 2307/42
See application file for complete search history.

(56) References Cited

U.S. PATENT DOCUMENTS

| | | | |
|---|---|---|---|
| 6,609,795 B2 | 8/2003 | Weber | |
| 6,707,608 B1 * | 3/2004 | Arieli | G02B 5/1857 359/569 |
| 9,285,593 B1 * | 3/2016 | Laskin | G02B 27/095 |
| 9,632,225 B2 * | 4/2017 | Miller | G03F 7/0005 |
| 2002/0180916 A1 | 12/2002 | Schadt | |
| 2003/0028048 A1 | 2/2003 | Cherkaoui | |
| 2005/0045799 A1 | 3/2005 | Deng | |
| 2005/0072959 A1 | 4/2005 | Moia | |
| 2005/0163977 A1 | 7/2005 | Miyatake | |
| 2006/0197068 A1 | 9/2006 | Schadt | |
| 2007/0139771 A1 | 6/2007 | Wang | |
| 2010/0073604 A1 * | 3/2010 | Okuyama | B29D 11/00644 349/193 |
| 2010/0165275 A1 * | 7/2010 | Tsukamoto | G02F 1/13363 359/486.01 |
| 2012/0314181 A1 * | 12/2012 | Wu | G02B 30/25 349/201 |
| 2014/0085597 A1 * | 3/2014 | Katou | B29C 33/3857 349/194 |
| 2017/0017028 A1 | 1/2017 | Miller et al. | |
| 2017/0017077 A1 | 1/2017 | Tang et al. | |
| 2017/0068100 A1 | 3/2017 | Ouderkirk | |

FOREIGN PATENT DOCUMENTS

| | | |
|---|---|---|
| JP | 2010107556 A | 5/2010 |
| WO | WO 2012-003215 | 1/2012 |
| WO | WO 2017-040875 | 3/2017 |
| WO | WO 2018-178817 | 10/2018 |

* cited by examiner

PATTERNED OPTICAL RETARDERS AND METHODS FOR MAKING THEREOF

BACKGROUND

Optical system may utilize a reflective polarizer, a partial reflector, and a phase retarder. Such optical systems are useful in head-mounted displays.

SUMMARY

In one aspect, the present disclosure is directed to a patterned optical retarder including non-overlapping first and second regions with respective first and second major surfaces having different RMS surface roughnesses. For substantially normally incident light over a wavelength ($\lambda$) range from about 400 nm to about 1000 nm, the optical retarder has different retardances in the respective first and second regions.

In another aspect, the present disclosure is directed to an optical element including an optical component with a patterned optical retarder thereon. The patterned optical retarder including non-overlapping first and second regions with respective first and second major surfaces having different RMS surface roughnesses. For substantially normally incident light over a wavelength ($\lambda$) range from about 400 nm to about 1000 nm, the optical retarder has different retardances in the respective first and second regions.

In another aspect, the present disclosure is directed to a method for making an optical element. In a polymeric optical retarder layer with a substantially uniform retardance $\delta$ for substantially normally incident light over a predetermined wavelength $\lambda$ from about 400 nm to about 1000 nm and including a surface, the method includes etching at least one first region of the surface such that the polymeric optical retarder layer has a non-zero retardance difference $\theta$ from $\delta$ in the at least one first region of the surface; and conforming the polymeric optical retarder layer to a surface of an optical component.

In another aspect, the present disclosure is directed to a method for making an optical element. The method includes applying a first mask to cover a first region of a polymeric optical retarder layer with a substantially uniform retardance $\delta$ for substantially normally incident light over a predetermined wavelength $\lambda$ in a range from about 400 nm to about 1000 nm; reactive ion etching the surface of the polymeric optical retarder layer such that a second region thereof uncovered by the mask has an optical thickness different from the optical thickness of the first region and a retardance difference $\theta$ less than the retardance $\delta$ of the first region; and conforming the polymeric optical retarder layer to a surface of an optical component.

In another aspect, the present disclosure is directed to a method for making an optical element. The method includes providing a polymeric film with an optical surface configured to receive light at a predetermined wavelength $\lambda$ in a range from about 400 nm to about 1000 nm, the optical surface defined by: a vertical axis and a horizontal axis defining four Cartesian quadrants sequentially numbered in a clockwise direction, a first longitudinal section substantially centered on the vertical axis, and a second longitudinal section substantially centered on the horizontal axis, the first and second longitudinal sections each extending across opposite edges of the optical surface, wherein the first and the second longitudinal sections each have a same substantially uniform retardance $\delta$ for substantially normally incident light; and reactive ion etching the surface of the polymeric film to form four discrete retarder sections, each retarder section disposed on a respective Cartesian quadrant of the optical surface, wherein each discrete retarder section has an optical thickness different from the optical thicknesses of the first and the second longitudinal sections and a retardance difference $\theta$ from $\delta$ greater than zero.

In another aspect, the present disclosure is directed to a method for making an optical element. The method includes providing a polymeric film with an optical surface configured to receive light at a predetermined wavelength $\lambda$ in a range from about 400 nm to about 1000 nm, the optical surface comprising non-overlapping central and first and second edge regions disposed at or near respective first and second edges thereof; reactive ion etching the surface such that for at least one wavelength $\lambda_0$ in the wavelength range: the central region has an average retardance substantially equal to $\delta$ for substantially normally incident light, the first edge region has an average retardance substantially equal to $\delta+\xi$, and the second edge region has an average retardance substantially equal to $\delta-\xi$, wherein for an integer n, $\lambda_0(n+\frac{1}{8}) \leq \delta \leq (n+\frac{1}{2})$ and $\delta/50 \leq \xi \leq \delta/2$.

In another aspect, the present disclosure is directed to a method for making an optical element. The method includes applying a coating over a first region of surface of a polymeric optical retarder layer, wherein the optical retarder layer has a substantially uniform retardance $\delta$ for substantially normally incident light over a predetermined wavelength $\lambda$ in a range from about 400 nm to about 1000 nm; reactive ion etching the first region such that the first region has a retardance over the predetermined wavelength range greater than a retardance of a second region uncoated by the coating; and conforming the polymeric optical retarder layer to a surface of an optical component, wherein the surface of the optical component has a non-zero optical power.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
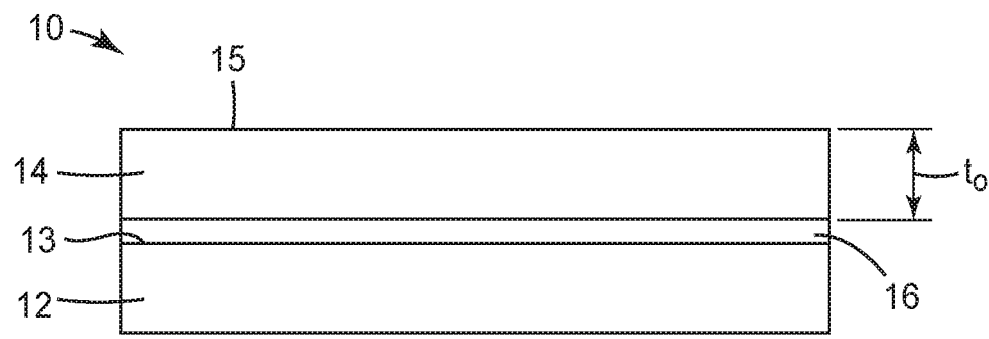
FIG. 1 is schematic cross-sectional view of an embodiment of an optical retarder according to the present disclosure.

An optical system includes optical elements such as lenses, polarizers, screens and the like, each with at least one optical surface configured to receive light at a predetermined wavelength. Defects such as, for example, manufacturing variances in the individual optical elements in the optical system, or misalignments between components in the system, may cause errors such as reduced brightness and contrast, and decrease optical performance. In addition, the curvature of the optical surfaces of the optical elements may refract or reflect light differently, or undesirably alter its polarization state, depending on the region of the surface upon which a light ray is incident on or exits the surface, or the angle at which the light ray is incident on or exits the surface.

The optical path of light rays traversing a selected region of the optical surface can be configured to at least partially compensate for alignment errors or curvatures in an optical element. For example, for an optical surface made of a material with a selected refractive index, a thicker region of the optical surface presents a longer optical path for a light ray traversing the optical component in that region, while a thinner region presents a shorter optical path for a light ray traversing the optical component therein. The thicker region of the optical surface thus retards the travel of a traversing light ray relative to the thinner region, and in the present application will be referred to as having a greater optical retardance than the optical retardance of the thinner region. By making the optical surface thicker in some regions and thinner in other regions, retardance of the optical component can be made non-uniform, which can correct for an optical defect present in an optical system and provide improved optical performance. For example, incorporation of an optical element with an optical surface configured to compensate for misalignment or surface curvature using a spatially varying non-uniform retardance may increase the contrast of an optical system, particularly in highly compact "folded" optical systems utilized in head mounted displays.

Assuming that a retarder layer with substantially uniform retardance δ for substantially normally incident light over a predetermined wavelength λ in a range from about 400 nm to about 1000 nm is used as a starting point, one suitable technique to change the retardance of a region of the layer to have a retardance different from δ requires that material be added to or removed from the optical surface in that region to adjust the optical path of light traversing the region. While many different techniques can be used to alter the thickness of a region of an optical surface, the surface characteristics of the region where the material is added or removed should be controlled to prevent undesirable loss of light incident on or passing through the region. For example, to prevent undesired reflection or absorption of light incident on the region, the surface roughness of the region should be relatively uniform across the region.

The present disclosure is directed to methods for altering an optical surface of an optical retarder to vary the optical retardance over a selected region of the surface while controlling the surface characteristics in the selected region. In some embodiments, the methods for altering the surface include etching the selected region of the optical surface to remove material from the surface to reduce the optical retardance in that region, while patterning the surface in the region to provide a desired diffuse or specular surface reflectance.

Referring to FIG. 1, a portion of an optical element 10 includes a substrate 12 with a major surface 13. In various embodiments, which are not intended to be limiting, the substrate 12 is any type of optical component that may be used in a display device such as lenses, reflective or absorptive polarizers, display panels, one or more optical retarders, and the like. For example, the substrate 12 can be a lens chosen from plano-convex, plano-concave, biconvex, positive meniscus, negative meniscus, gradient index, Fresnel, and combinations thereof. In some embodiments, the surface 13 of the substrate 12 has curvature that converges or diverges light, and as such will be referred to herein as having a non-zero optical power. In some embodiments, the curved major surface 13 is curved about one axis or curved about two orthogonal axes. In some embodiments, the major surface 13 can be nominally planar but may have some curvature due to ordinary manufacturing variations, for example, or may have a radius of curvature at least 10 times a distance from an image surface (e.g., at a display panel) to a stop surface of an optical system. The substrate 12 can be made from any suitable lens materials such as, for example, acrylic, polycarbonate or glass.

The predetermined wavelength range is the wavelength range over which the optical system or display system is designed to operate, and typically ranges from about 400 nm to about 1000 nm, or over the visible range (400 nm to 700 nm). As another example, the predetermined wavelength range may include one or more visible wavelength ranges. For example, the predetermined wavelength range may be the union of more than one narrow wavelength ranges (e.g., the union of disjoint red, green and blue wavelength ranges corresponding to light emission colors of a display panel). Such wavelength ranges are described further in U.S. Pat. Appl. Pub. No. 2017/0068100 (Ouderkirk et al.), incorporated herein by reference. In some embodiments, the predetermined wavelength ranges include other wavelength ranges (e.g., infrared (e.g., near infrared (about 700 nm to about 2500 nm)), or ultraviolet (e.g., near ultraviolet (about 300 nm to about 400 nm)) as well as visible wavelength ranges.

In some embodiments, the substrate 12 is a reflective polarizer configured to substantially reflect light having a first polarization state and substantially transmit light having an orthogonal second polarization state at a predetermined wavelength or predetermined wavelength range. For example, reflective polarizer may be said to substantially transmit light having a first polarization state at a predetermined wavelength or in a predetermined wavelength range if at least 60 percent of light having the first polarization state at the predetermined wavelength or in the predetermined wavelength range is transmitted through the polarizer. A reflective polarizer may be said to substantially reflect light having a second polarization state at a predetermined wavelength or a predetermined wavelength range if at least 60 percent of light having the second polarization state at the predetermined wavelength or in the predetermined wavelength is reflected from the reflective polarizer.

Any of the reflective polarizers may be linear reflective polarizers that reflect light having a first linear polarization state and transmit light having a second linear polarization state orthogonal to the first linear polarization state. Suitable reflective polarizers include polymeric multilayer optical films and wire-grid polarizers, for example. Any of the reflective polarizers can be a formed (e.g., thermoformed) reflective polarizer such as, for example, a thermoformed polymeric multilayer optical film. The polymeric multilayer optical film may include a plurality of alternating first and second polymeric layers. Suitable polymeric multilayer reflective polarizers are described, for example, in U.S. Pat. No. 5,882,774 (Jonza et al.), and U.S. Pat. No. 6,609,795 (Weber et al.). Methods of forming a reflective polarizer into a compound curve are described in U.S. Pat. Appl. Pub. No. 2017/0068100 (Ouderkirk et al.), previously incorporated herein by reference, and PCT Appl. No. US2016/050024 (Ouderkirk et al.) filed Sep. 2, 2016 and hereby incorporated herein by reference to the extent that it does not contradict the present description.

During forming the optical film is stretched to conform to the shape of a tool. The optical film is stretched since the desired shape is curved about two orthogonal axes. In contrast to this, an optical film would not need to be stretched to conform to a shape curved about only one axis. The process of forming can leave the optical film substantially uniaxially oriented at a first location (since the film is stretched along the orientation direction at this location during forming), but result in biaxial orientation at a second location due to the stretching of the optical film as it is formed.

The substrate 12 may also be a partial reflector layer that has an average optical reflectance and an average optical transmittance at a predetermined wavelength or in a predetermined wavelength range that are each in a range of 30% to 70%. For example, the partial reflector layer may be a half mirror. The average optical reflectance and average optical transmittance in a predetermined wavelength range refer to the unweighted average over the predetermined wavelength range and over polarizations of the optical reflectance and optical transmittance, respectively, determined at normal incidence unless indicated otherwise. The average optical reflectance and average optical transmittance at a predetermined wavelength refer to the unweighted average over polarizations of the optical reflectance and optical transmittance, respectively, determined at normal incidence unless indicated otherwise.

The partial reflector layer may be any suitable partial reflector. For example, the partial reflector layer may be constructed by coating a thin layer of a metal (e.g., silver or aluminum) on a transparent substrate (e.g., a film which may then be adhered to a lens, or the substrate may be a lens). The partial reflector layer may also be formed by depositing thin-film dielectric coatings onto a surface of a lens substrate, or by depositing a combination of metallic and dielectric coatings on the surface, for example. In some embodiments, the partial reflector layer may be a reflective polarizer or may have a polarization dependent reflectivity. In some examples, the partial reflector layer is a dielectric partial reflector layer.

In some embodiments, the substrate 12 is an optical retarder layer or even multiple retarder layers, which in various embodiments may have a uniform or a non-uniform retardance. In various embodiments, the retarder layer(s) can be polymeric films or coatings or a combination of polymeric films and coatings.

The optical element 10 further includes at least one retarder layer 14 that conforms to at least a portion of the surface 13 of the substrate 12. In various embodiments, the retarder layer(s) 14 can be polymeric films or coatings or a combination of polymeric films and coatings. In some embodiments, the films or coatings may be applied on the surface of a substrate by a process such as spin coating, atomic layer deposition, and the like.

Suitable polymeric films include birefringent polymer film retarders such as those available from Meadowlark Optics (Frederick, Colo.), for example. Suitable coatings for forming a retarder layer 14 include the linear photopolymerizable polymer (LPP) materials and the liquid crystal polymer (LCP) materials described in U.S. Pat. App. Pub. Nos. 2002/0180916 (Schadt et al.), 2003/028048 (Cherkaoui et al.), 2005/0072959 (Moia et al.) and 2006/0197068 (Schadt et al.), and in U.S. Pat. No. 6,300,991 (Schadt et al.). Suitable LPP materials include ROP-131 EXP 306 LPP and suitable LCP materials include ROF-5185 EXP 410 LCP, both available from ROLIC Technologies Ltd. (Allschwil, Switzerland).

In some embodiments, the optical element 10 further includes an optional attachment or alignment layer 16 between the retarder layer 14 and the surface 13 of the substrate 12. In one embodiment, the layer 16 may include an optical adhesive to adhere the retarder layer on the surface 13. In another embodiment, if the retarder layer 14 includes a liquid crystal material, the layer 16 may be an optional liquid crystal alignment layer.

Light rays (not shown in FIG. 1) are incident on or exit from the optical element at an optical surface 15 of the retarder layer 14. In some examples, the optical surface 15 may extend to a whole surface of an optical element 10, while in other examples, the optical surface 15 may be limited to a portion of an optical element, such as the portion of a major surface of an optical element that receives light associated with an image. In some embodiments, the surfaces 13, 15 of the substrate 12 and the retarder 14 may include additional anti-reflective layers (not shown in FIG. 1) such as, for example, an anti-reflective coating.

The optical surface layer 14 has a substantially uniform retardance for normally incident light with a predetermined wavelength $\lambda_0$ within the wavelength range of from about 400 nm to about 1000 nm that enters the optical element 10 at the surface 15. A retarder layer or retarder layer segment may be described as having a substantially uniform retardance if the variation in the retardance in the retarder layer is substantially less than a maximum difference in retardance across the retarder. For example, a retarder having substantially uniform retardance may be understood to mean that a maximum difference in retardance is no more than about 20%.

In some examples, the retarder layer 14 may be substantially a quarter-wave retarder. A retarder layer described as substantially a quarter-wave retarder at a specified wavelength can be understood to mean that the retarder layer has a retardance within 5 percent of ¼ of the specified wavelength for normally incident unpolarized light for at least 80 percent of a surface area of the retarder layer. A retarder layer may be substantially a quarter-wave retarder at a first wavelength and have a retardance substantially different from quarter wave at a different second wavelength. A retardance substantially different from quarter wave at a second wavelength can be understood to mean that the retardance is not within 5 percent of ¼ of the second wavelength. A quarter-wave retarder may have a spatially uniform orientation.

In some cases, the retarder layer 14 may include multiple stacked retarder layers with the multiple layers having different fast and slow axes, for example. In this case, an effective retardance and effective fast and slow axes of the retarder layer can be defined relative to a polarized light incident on the retarder and a polarized light transmitted through the retarder as the retardance and fast and slow axis orientation of a conventional single layer retarder that would convert the polarization state of the incident light to the polarization state of the transmitted light. The retardance of such a retarder layer refers to this effective retardance. For a retarder having a single layer, the effective fast and slow optical axes are the fast and slow optical axes of the single layer and the effective retardance is the retardance of the single layer. For a retarder layer having multiple layers where each layer has a fast and slow axis parallel to or rotated 90 degrees relative to effective fast and slow axes of the retarder, the effective retardance for normally incident light is the sum of the retardance of the layers with the respective fast and slow axes parallel to the effective fast and slow axes of the retarder minus the sum of the retardance of the layers with the respective fast and slow axes rotated 90 degrees relative to the effective fast and slow axes of the retarder.

Referring again to FIG. 1, the retarder layer 14 has a substantially uniform physical thickness $t_0$. In various embodiments, the physical thickness $t_0$ of the retarder layer 14 is less than about 5 µm, or less than about 2 µm, or even less than about 1 µm. In some examples, which are not shown in FIG. 1, the retarder layer 14 includes regions with different physical thicknesses, which can be desired when different materials are used so that different regions of the retarder layer 14 can each have an approximately quarter-wave retardance.

Figure 2A:
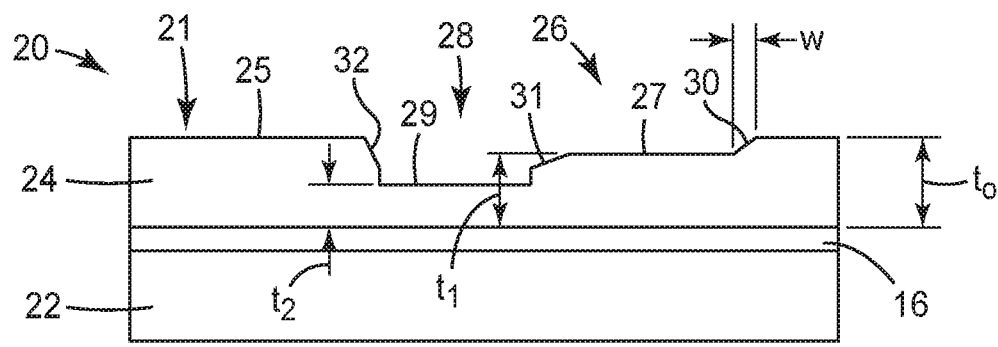
FIG. 2A is a schematic cross-sectional view of an optical retarder according to the present disclosure having a non-uniform retardance.

FIG. 2A shows an optical element 20 including a substrate 22 having thereon a retarder layer 24 with a non-uniform retardance. A retarder layer may be described as having a substantially non-uniform retardance if the variation in the retardance over a surface 25 of the retarder layer 24 is more than a maximum difference in retardances representing a uniform retardance, such as the uniform retardance described above. For example, a retarder layer having a substantially non-uniform retardance can be understood to mean that a maximum difference in retardances between the regions of the retarder layer is greater than 20%.

The surface 25 includes a region 21 with a substantially uniform retardance and physical thickness $t_0$. In some embodiments, the surface 25 in the region 21 has an average surface roughness ($R_a$ or RMS according to ASME B46.1) that varies less than about 20%, less than about 10%, less than about 5%, or less than about 1% over a 2 µm square test area, as measured using a technique such as, for example, interferometry, confocal microscopy, contact profilometry, and the like. The surface 25 further includes at least one first region 27 in which material has been removed from the surface 25 such that the region 27 has a physical thickness $t_1 < t_0$. Sufficient material has been removed from the region 27 such that the difference in retardance from the substantially uniform retardance $\delta$ of the surface 27 is $\theta$, wherein $\theta$=at least 0.01 times the predetermined wavelength $\lambda_0$, or $0.02\lambda_0$, $0.03\lambda_0$, $0.04\lambda_0$, $0.05\lambda_0$, $0.06\lambda_0$, $0.07\lambda_0$, $0.08\lambda_0$, $0.09\lambda_0$, $0.1\lambda_0$, $0.15\lambda_0$, $0.2\lambda_0$, $0.25\lambda_0$, $0.3\lambda_0$, $0.35\lambda_0$, $0.4\lambda_0$, $0.45\lambda_0$, $0.5\lambda_0$, $0.55\lambda_0$, $0.6\lambda_0$, $0.65\lambda_0$, $0.7\lambda_0$, $0.75\lambda_0$, $0.8\lambda_0$, $0.85\lambda_0$, $0.9\lambda_0$, $0.95\lambda_0$, or $\lambda_0$.

The optical element 20 further includes transition regions 30, 31 on either side of the region 27, over which the thickness of the surface 25 gradually changes and "transitions down" from $t_0$ to $t_1$ or "transitions up" from $t_1$ to $t_0$. The width w of the transition regions 30, 31 may vary widely, and the transitions may be stepwise or more smoothly sloping, and the change in slope may be continuous or discontinuous. In some embodiments, w can range from about 5 µm to about 10 mm, or from about 1 mm to about 5 mm.

In some cases, the retarder layer 20 may include a shallower first etched region 26 and a deeper second etched region 28 adjacent to first etched region 26. In such cases, there may be a first transition region 30 between top surface 25 and the surface 27 of the first etch region 26, a second transition region 31 between the surface 27 and surface 29 of the second etched region 28, and a third transition region 32 between the surface 29 of the second etched region 28 and the top surface 25. In some cases, the physical thickness $t_o$ of the retarder layer 24 may be in a range from about 0.2 microns to about 3 microns, or from about 0.2 microns to about 2.5 microns, or from about 0.2 microns to about 2 microns. The thickness of the retarder layer 24 in the first etched region 26 may be less by about 0.05 to about 0.5 microns, or by about 0.1 to about 0.5 microns. The thickness of the retarder layer 24 in the second etched region 28 may be less than the thickness of the retarder layer 24 in the first etched region 26 by about 0.01 microns to about 0.05 microns. The height of the first transition region is $t_0$-$t_1$, and may be in a range from about 50 nm to about 500 nm, or from about 50 nm to about 400 nm, or from about 50 nm to about 300 nm. Similar ranges may apply to the second and third transition regions.

In various embodiments, the retarder layer 24 thus includes one or a plurality of discrete regions that create non-uniform retardance. While the retarder layer 24 as a whole may have a non-uniform retardance, each discrete region 26, 28 may have a uniform retardance across the discrete retarder section.

The regions 26, 28 include surfaces 27, 29 that have predetermined surface characteristics including, but not limited to, surface roughness. In some cases, the surface structures of the surfaces 27, 29 can be tailored to provide a desired level of diffuse or specular reflectance, or to provide an anti-reflective or anti-glare surface finish, for light rays reflecting from or passing through the surfaces 27,29. In some embodiments, to provide a desired level of reflectance or reflectivity, the surface texture of the surfaces 27, 29 should be as uniform as possible. In some embodiments, the surfaces 27, 29 have an average surface roughness ($R_a$ or RMS according to ASME B46.1) that varies less than about 20%, less than about 10%, less than about 5%, or less than about 1% over a 2 μm square test area, as measured using a technique such as, for example, interferometry, confocal microscopy, contact profilometry, and the like. In various embodiments, for example, the surface average surface roughness ($R_a$ according to ASME B46.1) of the surfaces 27, 29 should be less than about 5 μm, or less than about 3 μm, or less than about 2 μm, over a 2 μm square test area of the surface.

Figure 2B:
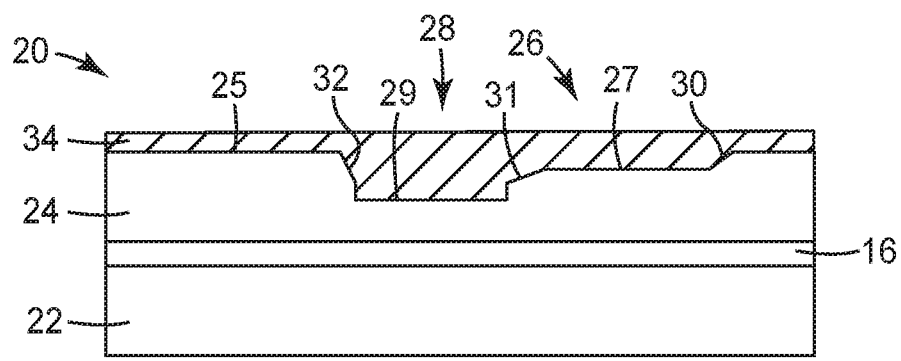
FIG. 2B is a schematic cross-sectional view of the optical retarder of FIG. 2A having an additional layer applied thereon.

In an example embodiment shown in FIG. 2B, an additional layer or group of layers 34 may be applied over the surfaces 25, 27 and 29 of the retarder layer 24. In various embodiments, the layers 34 may be laminated to the retarder layer 24, or may be adhered to the retarder layer 34 with or without a layer of an optical adhesive (not shown in FIG. 2B). In various embodiments, which are not intended to be limiting, the layer 34 may be chosen from any of the layers discussed above as being suitable for the substrate 12 such as lenses, reflective or absorptive polarizers, display panels, one or more optical retarders, and the like. In some embodiments, the layer 34 is a coating selected to provide an optical effect such as, for example, an antireflective coating, or a protective coating that resists scratching or marring.

The present inventors have determined that an etching process can be used to remove a precise amount of material from the surface 25 to form the regions 26, 28 and provide a predetermined level of optical retardance for light rays passing through the region. The present inventors have also determined that etching provides good control over the texture of the surfaces 27, 29. The etching process may vary widely depending on the type of material selected for the retarder layer 24, but in embodiments where the retarder layer 24 is a polymeric material, suitable etching processes include wet etching processes such as, for example, chemical etching, as well as dry etching processes such as, for example, plasma etching and reactive ion etching (RIE).

The RIE process, which can provide a more directional and anisotropic etch profile than chemical etching or plasma etching, utilizes a chemically reactive plasma to remove material from the surface 25 to form the regions 26, 28. The ions in the plasma in the RIE react with the surface of the 25, and also sputter away material from the surface 25, which creates region 26, 28 with precise dimensions and surface roughness.

Figure 3:
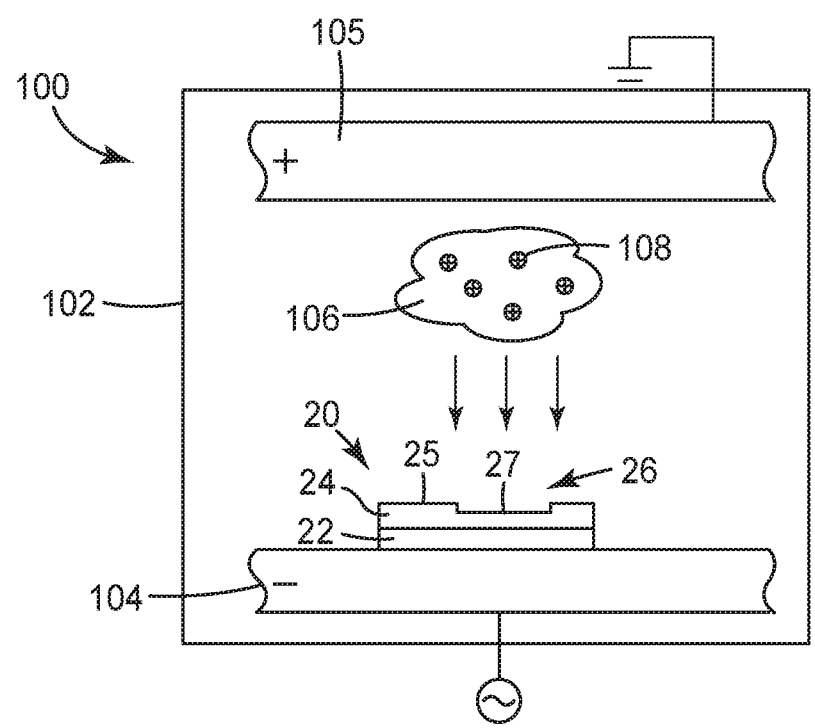
FIG. 3 is a schematic diagram of an embodiment of an etching apparatus that can be used to make the patterned optical retarders of the present disclosure.

Referring to the schematic diagram of a typical RIE apparatus in FIG. 3, which is not intended to be limiting, a RIE system 100 includes a vacuum chamber 102 having therein a mounting platter 104 configured to retain an optical element 20 including a retarder layer 24. The mounting platter 104 is electrically isolated from the rest of the chamber 102. An etch gas 106 is introduced into the chamber 102 and a strong oscillating radio frequency (RF) field between electrodes 104, 105 ionizes the etch gas molecules 108 to create a plasma. The positive ions of the plasma move toward the surface 25 and chemically and physically interact with the surface 25 to remove material from the surface 25 and form the region 26.

Suitable RIE etch conditions can vary widely depending on the polymeric material selected for the retarder layer 24. Suitable RIE etch gases include more reactive chemical moieties such as oxygen, as well as less reactive chemical moieties such as argon. The more reactive chemical moieties enhance the chemical reaction at the surface 25, while with the less reactive chemical moieties enhance the physical interaction or sputtering tends to predominate.

Referring again to FIG. 2A, in some embodiments, a mask may be applied over the surface 25 of the retarder layer 24 to produce an etched region 26, 28 with predetermined dimensions, or to produce a predetermined pattern of etched regions 26, 28 on the surface 25. Referring to the process 200 illustrated schematically in FIGS. 4A-4C, a polymeric optical retarder layer 224 has a substantially uniform retardance δ for substantially normally incident light on a surface 225 at a predetermined wavelength $\lambda_0$, as well as a thickness $t_0$.

Figure 4A:
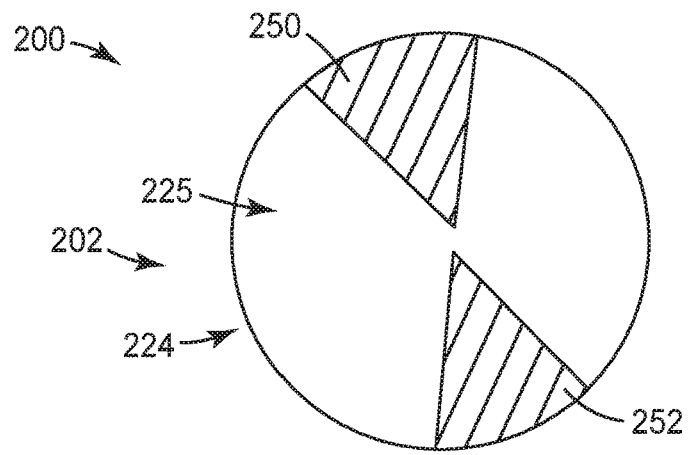
FIGS. 4A-4C are schematic overhead view of a process for making a patterned optical retarder including a series of etching and masking steps.

In step 202 of FIG. 4A, a first mask 250 and a second mask 252 are placed over respective regions 251 and 253 (not shown in FIG. 4A) of the surface 225, and the surface 225 is reactive ion etched. In various embodiments, the masks 250, 252 may be placed relatively close above the surface 225, or farther above the surface 225. If a mask is placed farther above the surface, a transition region between the resulting etched region of the surface 225 and an adjacent non-etched region (see, for example, FIG. 2) will be narrow, and provide a relatively sharp boundary therebetween. If the mask is placed farther away from the surface 225, the transition region between the resulting etched and unetched regions will be relatively wide, and the boundary between the etched and unetched regions more gradual.

After the initial RIE step 202, a region 255 of the surface 225 uncovered by the masks 250, 252 has a physical thickness $t_1$ less than the physical thicknesses of the portions covered by the masks 250, 252. The region 255 has a retardance difference θ less than the original retardance δ of the layer 224, wherein θ=at least 0.01 times the predetermined wavelength $\lambda_0$, or $0.02\lambda_0$, $0.03\lambda_0$, $0.04\lambda_0$, $0.05\lambda_0$, $0.06\lambda_0$, $0.07\lambda_0$, $0.08\lambda_0$, $0.09\lambda_0$, $0.1\lambda_0$, $0.15\lambda_0$, $0.2\lambda_0$, $0.25\lambda_0$, $0.3\lambda_0$, $0.35\lambda_0$, $0.4\lambda_0$, $0.45\lambda_0$, $0.5\lambda_0$, $0.55\lambda_0$, $0.6\lambda_0$, $0.65\lambda_0$, $0.7\lambda_0$, $0.75\lambda_0$, $0.8\lambda_0$, $0.85\lambda_0$, $0.9\lambda_0$, $0.95\lambda_0$, or $\lambda_0$.

Figure 4B:
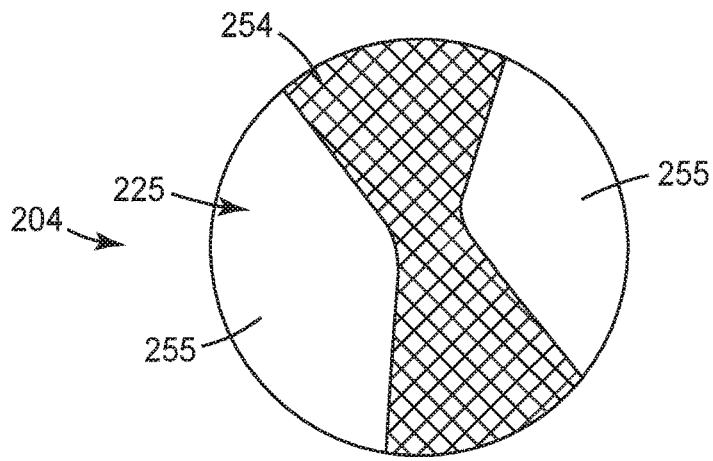

In FIG. 4B, a second mask 254 is placed over the surface 225 to overlie the original portions of the surface 225 covered by the masks 250, 252, as well as portions of the region 225, and the surface of the retarder layer is again etched using RIE in step 204. In step 204, portions of the region 255 that were etched in the first etch 202 of FIG. 4A are etched a second time, while the originally masked regions 251, 253 remain masked and unetched.

Figure 4C:
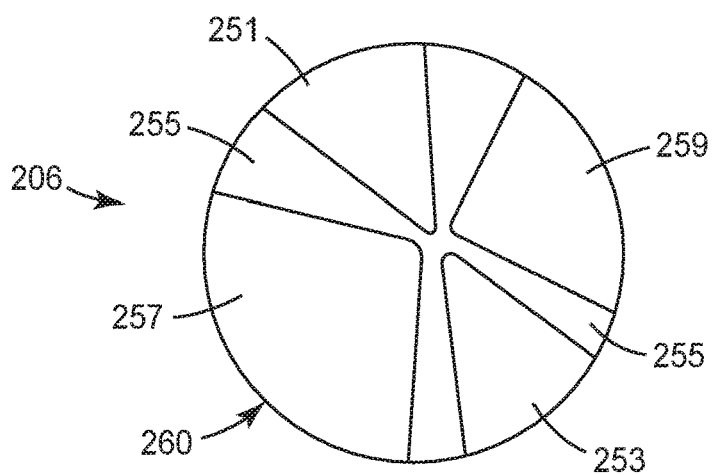

In step 206 illustrated in FIG. 4C, the second mask 254 is removed, which provides a patterned optical retarder layer 260. The second etch step 204 removes additional material from the regions 255 to form regions 257, 259. The regions 257, 259, which have been etched twice, have a physical thickness $t_2$ less than the physical thicknesses $t_0$ of the portions 251, 253 covered by the masks 250, 252 and an optical thickness less than the physical thickness $t_1$ of the portion of the regions 255 covered by the second mask 254. Thus, the regions 251, 253 have the greatest physical thickness and greatest optical retardance. The regions 255 have a thickness and optical retardance greater than the thickness and the optical retardance of the regions 257, 259.

Following the removal of the mask 254 (FIG. 4C), the patterned optical retarder layer 260 may be applied to or conformed with a surface of an optical component.

Using a combination of coating steps, application of masks and etching steps, a wide variety of patterned polymeric retarders may be formed and applied on the surface of an optical element, or even formed while applied on the surface of the underlying optical element.

Figure 5A:
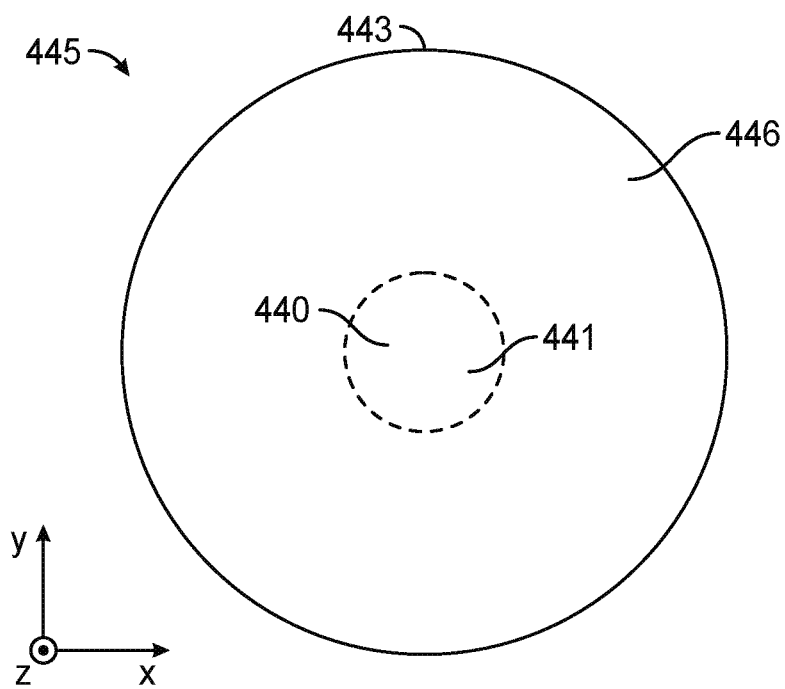
FIGS. 5A-5D are schematic overhead views of various embodiments of patterned retarder layers.

In one example, FIG. 5A is a schematic front plan view of retarder layer 445 including regions 441 and 446. In some embodiments, the region 441 of the retarder layer 445 has a substantially spatially constant retardance and the region 446 has a spatially varying retardance. For example, a maximum difference in the retardance over the region 441 may be less than 10% (or less than 5%, or less than 3%) of a maximum difference in the retardance over the region 446. In FIG. 5A, the region 441 is an interior region near the center of the retarder layer 445. An optical axis 440 of an optical system including the retarder layer 445 (not shown in FIG. 5A) intersects the retarder layer 445 in the region 441. The region 446 is a perimeter region surrounding the region 441 and extends to the edge 443 of the retarder layer 445.

In some cases, the orientation of the retarder layer 445 may be specified relative to a first polarization state (e.g., an angle between the fast optical axis and an axis (e.g., block axis) of the first polarization state. In some embodiments, relative to the first polarization state, the retarder layer 445 has a substantially non-uniform retardance across the retarder layer. This first retarder layer may then optionally be oriented with respect to another second retarder layer to provide a desired optical effect when a light ray passes through the first and the second retarder layers.

In some cases, a retarder layer may include multiple stacked retarder layers with the multiple layers having different fast and slow axes, for example. In this case, an effective retardance and effective fast and slow axes of the retarder layer can be defined relative to a polarized light incident on the retarder and a polarized light transmitted through the retarder as the retardance and fast and slow axis orientation of a conventional single layer retarder that would convert the polarization state of the incident light to the polarization state of the transmitted light. The retardance of such a retarder layer refers to this effective retardance. For a retarder having a single layer, the effective fast and slow optical axes are the fast and slow optical axes of the single layer and the effective retardance is the retardance of the single layer. For a retarder having multiple layers where each layer has a fast and slow axis parallel to or rotated 90 degrees relative to effective fast and slow axes of the retarder, the effective retardance for normally incident light is the sum of the retardance of the layers with the respective fast and slow axes parallel to the effective fast and slow axes of the retarder minus the sum of the retardance of the layers with the respective fast and slow axes rotated 90 degrees relative to the effective fast and slow axes of the retarder.

The optical thickness of a retarder for a specified effective fast or slow optical axis refers to the sum over each layer of the retarder of the refractive index of the layer along the specified effective fast or slow optical axis times the thickness of the layer. For example, in some embodiments, a first retarder layer has a first optical thickness at the origin and a different second optical thickness at least one other location for one of an effective fast optical axis of the first retarder layer or an effective slow optical axis of the first retarder layer. The first optical thickness is the refractive index along one of the effective fast and slow optical axes times the local physical thickness, and the second optical thickness is the refractive index along the same one of the effective fast and slow optical axes times the local physical thickness. The retardance of a retarder can be spatially varied by spatially varying the optical thickness of the retarder for an effective fast or slow optical axis and this can be done by spatially varying the thickness and/or the refractive indices along the effective fast or slow axis by a suitable selection of orientation of the layers of the retarder.

Figure 5B:
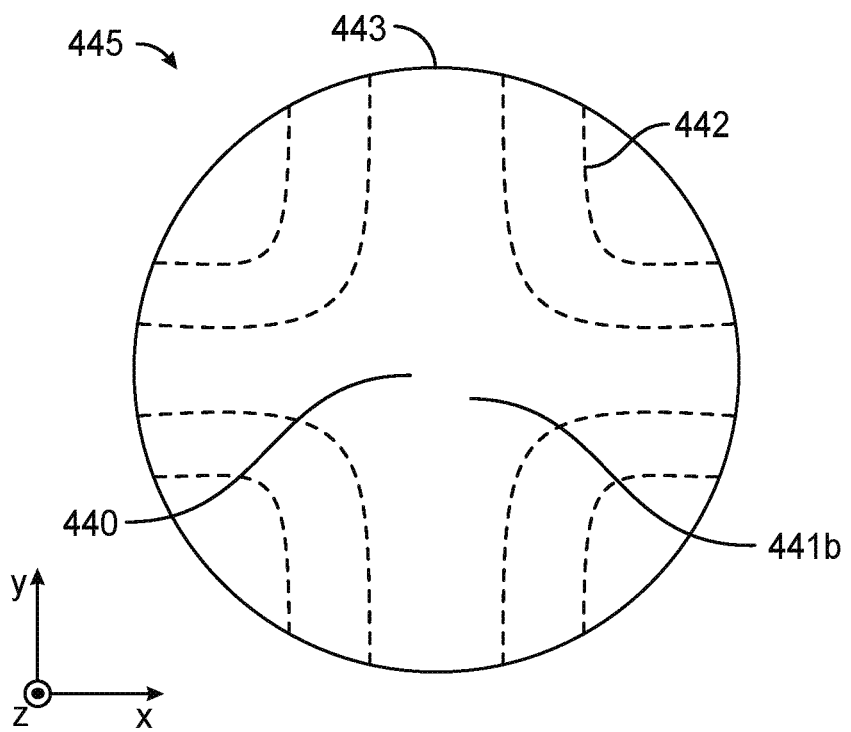

FIG. 5B illustrates retardance contours 442 in another embodiment of retarder layer 445. In some embodiments, the region in which the retardance is spatially substantially constant includes portions that extend to the edge 443 of the retarder layer 445 as illustrated in FIG. 5B. In some embodiments, the retardance is monotonically non-decreasing from a center of the retarder layer 445 to an edge 443 of the retarder layer along the +x+y directions and −x−y directions and is monotonically non-increasing from a center of the retarder layer 445 to an edge 443 of the retarder layer along the +x−y and −x+y directions. In some embodiments, the retardance is monotonically non-increasing from a center of the retarder layer 445 to an edge 443 of the retarder layer along the +x+y and −x−y directions and is monotonically non-decreasing from a center of the retarder layer 445 to an edge 443 of the retarder layer along the +x−y and −x+y directions.

Figure 5C:
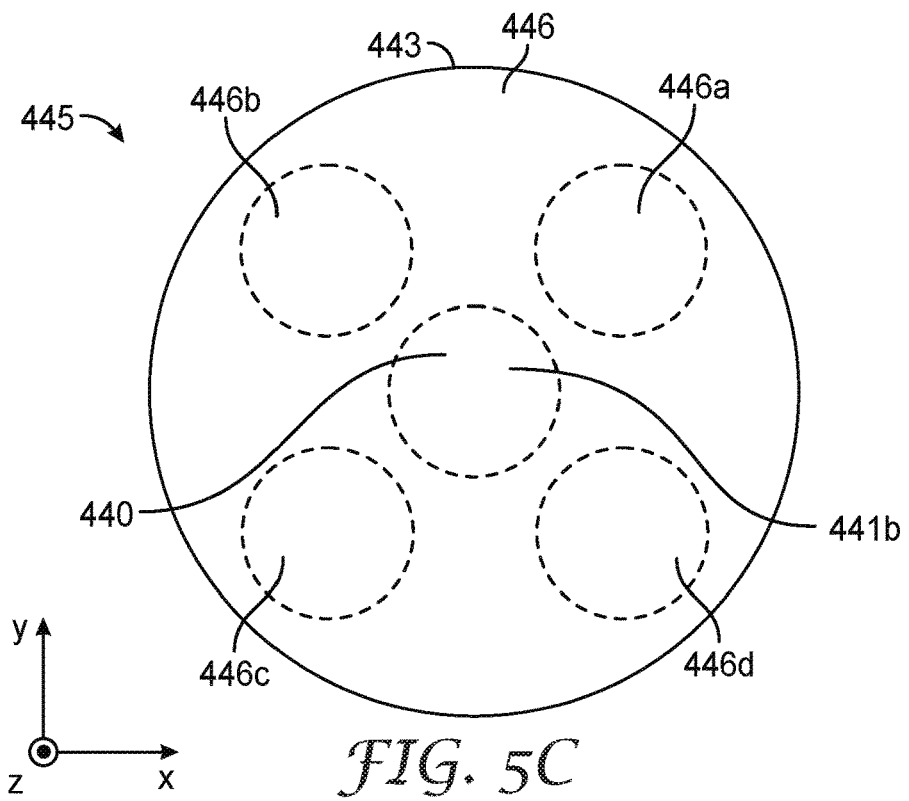

In some embodiments, the retarder layer 445 is symmetric under 180° rotations about the z-axis. In some embodiments, a difference between the retardance and the retardance at the optical axis 440 is antisymmetric under a 90° rotation about the z-axis. In some embodiments, the second region 446 includes regions 446*a*-446*d* as illustrated in FIG. 5C. In some embodiments, regions 446*a* and 446*c* have a lower average retardance than region 441 and regions 446*b* and 446*d* have a higher average retardance than region 441. In some embodiments, regions 446*a* and 446*c* have a higher average retardance than region 441 and regions 446*b* and 446*d* have a lower average retardance than region 441.

The relative size of the regions may be described in terms of the surface area of the regions or in terms of the area as determined in a plan view from a plane orthogonal to the optical axis. In some embodiments, in a plan view, the retarder layer 445 has an area A, the region 441 has an area in a range from about A/10 to about 2A/3, and each of the first through fourth regions 446*a*-446*d* has an area in a range from about A/12 to about A/3. In some embodiments, a retarder includes a first region (e.g., region 441) and a nonoverlapping second region (e.g., region 446) where the second region is the remaining portion of the retarder. In some embodiments, the first region is a central region and the second region is a peripheral region (i.e., a region which includes at least a portion of a periphery or edge of the retarder) which may surround the central region. In some embodiments, region 441 has a surface area of at least 10 percent of the total surface are of the retarder layer 445. It will be understood that the surface area and total surface area refers to the surface area of one major surface of the retarder.

Figure 5D:
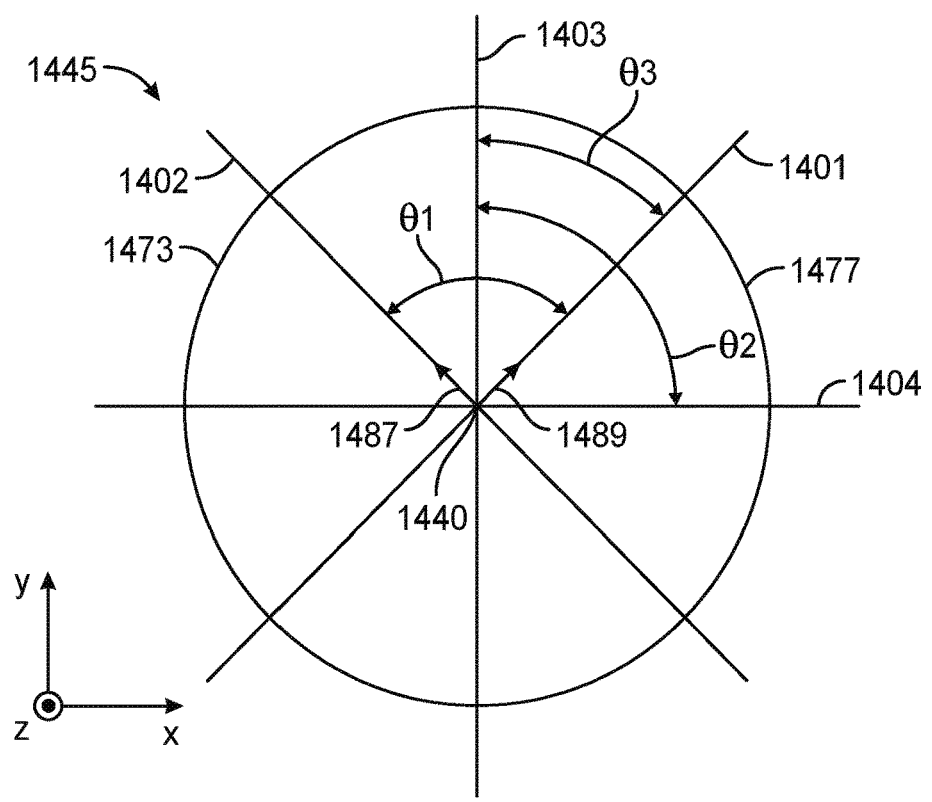

Referring also to FIG. 5D, in some embodiments the retarder layer 445 has a non-overlapping central and first and second edge regions. For example, the central region may correspond to region 441, and the first and second edge regions may correspond to or regions 446*a* and 446*b*, which are disposed at or near respective first and second edges (e.g., edges 1473 and 1477) of the retarder. The central region (e.g., region 441) includes a first origin (e.g., corresponding to where optical axis 440 intersects retarder layer 445).

For at least one first wavelength $\lambda_0$ in a predetermined wavelength range, if the central region has an average retardance substantially equal to $\delta$; the first edge region has an average retardance substantially equal to $\delta-\xi$; and the second edge region has an average retardance substantially equal to $\delta+\xi$. In some embodiments for an integer n, $\lambda_0$ $(n+\frac{1}{8}) \leq \delta \leq \lambda_0 (n+\frac{1}{2})$ and $\delta/50 \leq \xi \leq \delta/2$. In some embodiments, $\delta$ is substantially equal to $\lambda_0 (n+\frac{1}{4})$ or $\lambda_0/4$. In some embodiments, $\xi$ is no less than $\delta/20$, or no less than $\delta/10$. In some embodiments, $\xi$ is no greater than $\delta/4$, or no greater than $\delta/5$. For example, in some embodiments, $\delta/20 \leq \xi \leq \delta/5$.

The integer n in the formulas above may be any nonnegative integer. For example, n may be zero. A quarter-wave retarder, for example, would have $\delta = \lambda_0/4$ which satisfies the inequities $\lambda_0 (n+\frac{1}{8}) \leq \delta \leq \lambda_0 (n+\frac{1}{2})$ with n=0. Increasing the thickness of a quarter-wave retarder such that the retardance is $(n+1)\lambda_0/4$ for positive n, results in the same change to the polarization state of normally incident light transmitted through the retarder. In some embodiments, retarder layers described herein as having a substantially quarter-wave retardance are replaced with retarder layers having a retardance of $(n+1)\lambda_0/4$ for positive n. In some embodiments, n is 0, and in some embodiments, n is 1.

In some embodiments, the retarder further includes third and fourth edge regions 446c and 446d, where the central region is between the first and third edge regions and between the second and fourth edge regions.

In some embodiments, for the at least one first wavelength $\lambda_0$ in the predetermined wavelength range, the third edge region has an average retardance substantially equal to $\delta-\xi$, and the fourth edge region has an average retardance substantially equal to $\delta+5$.

In some embodiments, the retarder has a retardance at the first origin for the at least one first wavelength $\lambda_0$ in the predetermined wavelength range, of $\delta_0$. In some embodiments, $\delta_0$ is equal to or substantially equal to $\delta$. In some embodiments, for the at least one first wavelength $\lambda_0$ in the predetermined wavelength range, each of the first and second edge regions has a substantially uniform retardance. In some embodiments, for the at least one first wavelength $\lambda_0$ in the predetermined wavelength range, at least one of the first and second edge regions has a varying retardance. In some embodiments, the retarder further includes third and fourth edge regions. In some embodiments, for the at least one first wavelength $\lambda_0$ in the predetermined wavelength range, at least one of the first through fourth edge regions has a substantially uniform retardance. In some embodiments, for the at least one first wavelength $\lambda_0$ in the predetermined wavelength range, each of the first through fourth edge regions has a substantially uniform retardance.

FIG. 5D is a plan view of retarder 1445 which may correspond to retarder layer 445. Planes 1401, 1402, 1403 and 1404 are illustrated. These planes intersect each other along a line (parallel to the z-axis) which intersects the retarder 1445 at the point 1440. Each of the planes intersects the retarder 1445 along a respective curve passing through the point 1440. In some embodiments, a retardance of the first retarder increases in a first direction 1487 away from the center, which may be point 1440, to an edge 1473 of the retarder 1445 and decreases in a second direction 1489 away from the center to an edge 1477 of the retarder 1445. In some embodiments, the first and second directions 1487 and 1489 are along first and second intersections of the retarder 1445 with the planes 1402 and 1401, respectively. When used in an optical system, the line may be the optical axis of the optical system and the point 1440 may be the first origin of the retarder layer intersected by the optical axis. In this case, each of the planes 1401, 1402, 1403 and 1404 contain the optical axis. The retarder 1445 may include a central region corresponding to region 441 and first through fourth edge regions corresponding to regions 446a-446d, which are not labeled in FIG. 5D for ease of illustration. In some embodiments, plane 1401 intersects the retarder 1445 in the central region and in the first edge region and plane 1402 intersects the retarder 1445 in the central region and in the second edge region. In some embodiments, the angle $\theta 1$ between the planes 1401 and 1402 is in a range from about 60 degrees to about 120 degrees, or in a range from about 70 degrees to about 110 degrees. In some embodiments, the angle $\theta 1$ is about 90 degrees. In some embodiments, the angle $\theta 2$ between the planes 1403 and 1404 is in a range from about 60 degrees to about 120 degrees, or in a range of about 70 degrees to about 110 degrees. In some embodiments, the angle $\theta 2$ is about 90 degrees. In some embodiments, the angle $\theta 3$ between the planes 1401 and 1404 is in a range from about 30 degrees to about 60 degrees, or in a range from about 35 degrees to about 55 degrees. In some embodiments, the angle $\theta 3$ is about 45 degrees.

In some embodiments, for the at least one first wavelength $\lambda_0$ in the predetermined wavelength range, the retarder 1445 has a retardance that is substantially symmetric under reflection about the plane 1401 and substantially symmetric under reflection about the plane 1402. The retardance may be described as substantially symmetric under reflection about a plane if the retardance at each point in at least 80 percent of a surface area of the retarder differs from the retardance at a corresponding point determined by reflecting the point about the plane by no more than 10 percent of the maximum variation in the retardance of the retarder. In some embodiments, the retardance at each point in at least 90 percent, or at least 95 percent, of a surface area of the retarder differs from the retardance at a corresponding point determined by reflecting the point about the plane by no more than 10 percent, or by no more than 5 percent, of the maximum variation in the retardance of the retarder.

In some embodiments, for the at least one first wavelength $\lambda_0$ in the predetermined wavelength range, the retarder 1445 has a retardance such that a difference in the retardance and the retardance at the point 1440 is substantially antisymmetric under reflection about the plane 1403 and substantially antisymmetric under reflection about the plane 1404. The difference in retardance may be described as substantially antisymmetric under reflection about a plane if the difference in retardance at each point in at least 80 percent of a surface area of the retarder differs from the negative of the difference in retardance at a corresponding point determined by reflecting the point about the plane by no more than 10 percent of the maximum variation in the retardance of the retarder. In some embodiments, the difference in retardance at each point in at least 90 percent, or at least 95 percent, of a surface area of the retarder differs from the negative of the difference in retardance at a corresponding point determined by reflecting the point about the plane by no more than 10 percent, or by no more than 5 percent, of the maximum variation in the retardance of the retarder.

In some embodiments, for the at least one first wavelength $\lambda_0$ in the predetermined wavelength range, the retardance of the first edge region decreases in a direction away from the first origin toward the first edge 1477, and the retardance of the second edge region increases in a direction away from the first origin 1440 toward the second edge 1473. For example, the retardance may decrease in a direction (e.g., the +x+y direction) from the first origin 1440 to the edge 1477 and may increase in a direction (e.g., the −x+y direction) from the first origin 1440 to the edge 1473.

Figure 6A:
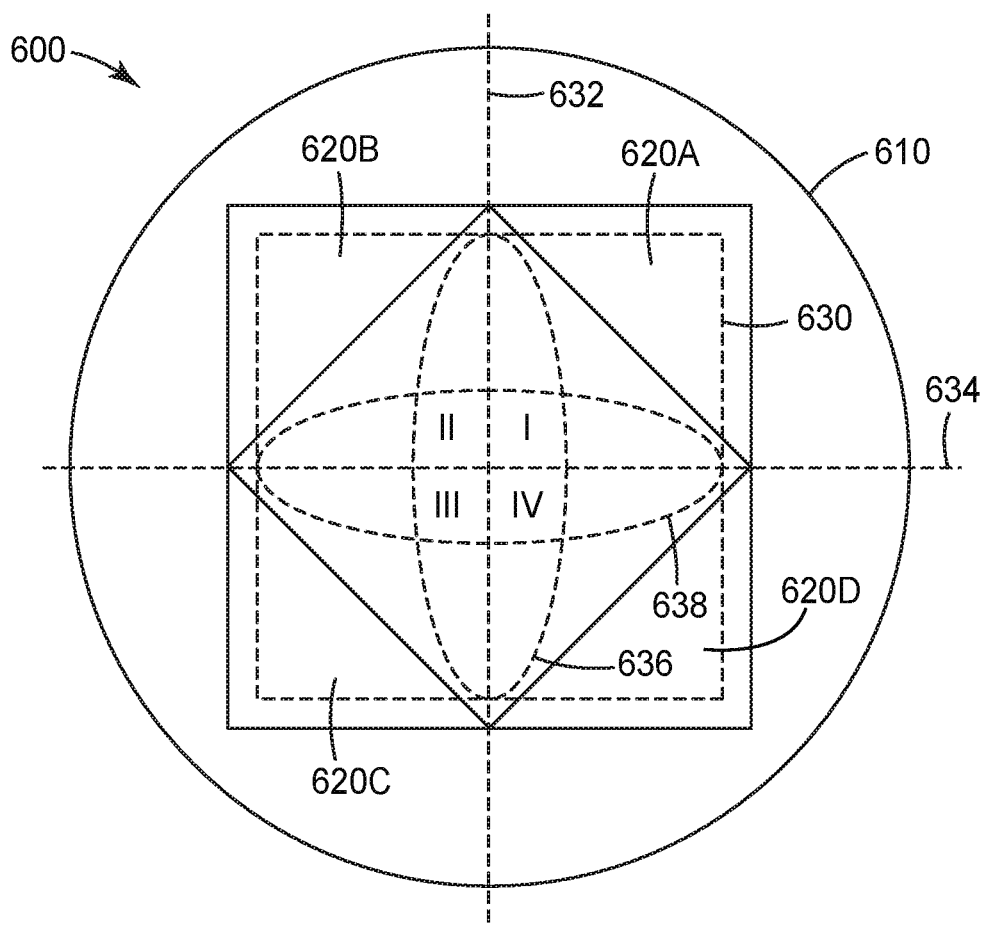
FIGS. 6A-6D are schematic overhead views of a patterned optical retarder and discrete retarder regions having various shapes.

Referring to another embodiment of a patterned optical retarder 600 shown in FIG. 6A, an optical surface 630 may be defined by a vertical axis 632 and a horizontal axis 634. Vertical axis 632 and horizontal axis 634 may define four Cartesian quadrants (I, II, III, IV). In the example of FIG. 6A, the Cartesian quadrants are sequentially numbered in a clockwise direction.

Optical surface 630 may include a first longitudinal region 636 substantially centered on vertical axis 632 and a second longitudinal region 638 substantially centered on horizontal axis 634. First longitudinal region 636 and second longitudinal region 638 may each extend across opposite edges of the optical surface.

The first longitudinal region 636 and the second longitudinal region 638 may have a same substantially uniform retardance (δ) for substantially normally incident light. A substantially uniform retardance may be understood to mean that the maximum variation of the retardance in each of first and second longitudinal regions 636 and 638 (maximum minus minimum retardance in the region) may be no more than 10% of the maximum variation of the retardance in the respective longitudinal region. In examples where optical surface 630 is a surface of an optical lens, the substantially uniform retardance may be zero. In some examples, first and second longitudinal regions 636 and 638 cover at least 10% of a surface area of optical surface 630.

Third retarder layer 620 may include a plurality of discrete retarder regions. In some examples, the plurality of discrete retarder sections may be physically discrete, such that no two retarder sections are physically touching. In some examples, two or more of the plurality of discrete retarder sections may be physically touching or joined, but may cover discrete portions of optical surface 630.

In the example of FIG. 6A, third retarder layer 620 includes four discrete retarder regions, including first retarder region 620A, second retarder region 620B, third retarder region 620C, and fourth retarder region 620D. Each discrete retarder region 620A, 620B, 620C, 620D, may be disposed on a respective Cartesian quadrant I, II, III, IV, of optical surface 630.

Each discrete retarder region in FIG. 6A may have a retardance difference θ from the substantially uniform retardance δ of first and second longitudinal region 626 and 628 that is greater than zero. In some examples, each discrete retarder region 620B, 620C, 620D, has a substantially uniform retardance difference from the substantially uniform retardance of first and second longitudinal regions 626 and 628. For example, each discrete retarder region 620B, 620C, 620D, may have a retardance difference of at least about 0.2λ from the retardance of first and second longitudinal regions 626 and 628.

Figure 6B:
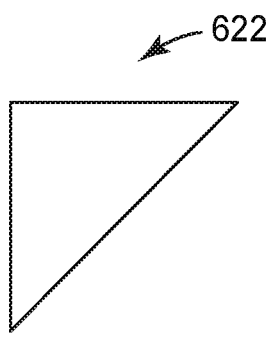
Figure 6C:
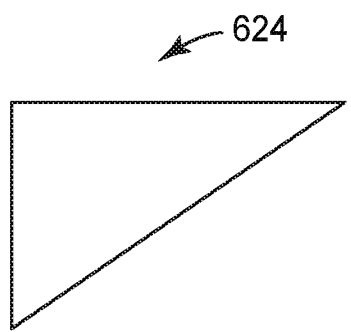
Figure 6D:
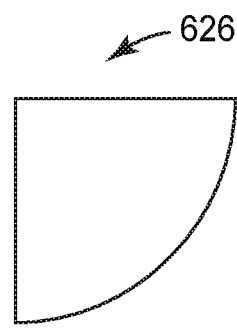

FIGS. 6B-6D are schematic views of discrete optical retarder regions having various shapes. FIG. 6B illustrates a discrete retarder section 622 having a right-angle triangle shape that includes a right angle and squared sides. Discrete retarder region 622 may be used for an optical surface that receives a square image, for example. FIG. 6C illustrates a discrete retarder region 624 having a right-angle triangle shape that includes a right angle and rectangular sides. Discrete retarder region 624 may be used for an optical surface receives a wide-angle image, for example. In some embodiments, the hypotenuse of the retarder sections 622, 624 may have a curvature. FIG. 6D illustrates a discrete retarder region 626 having circle quadrant shape that includes a right angle, squared sides, and a circular hypotenuse. The discrete retarder region 626 may be used for an optical surface that is curved, for example. Other shapes that may be used include, but are not limited to, circles, squares, triangles, and the like.

Figure 7:
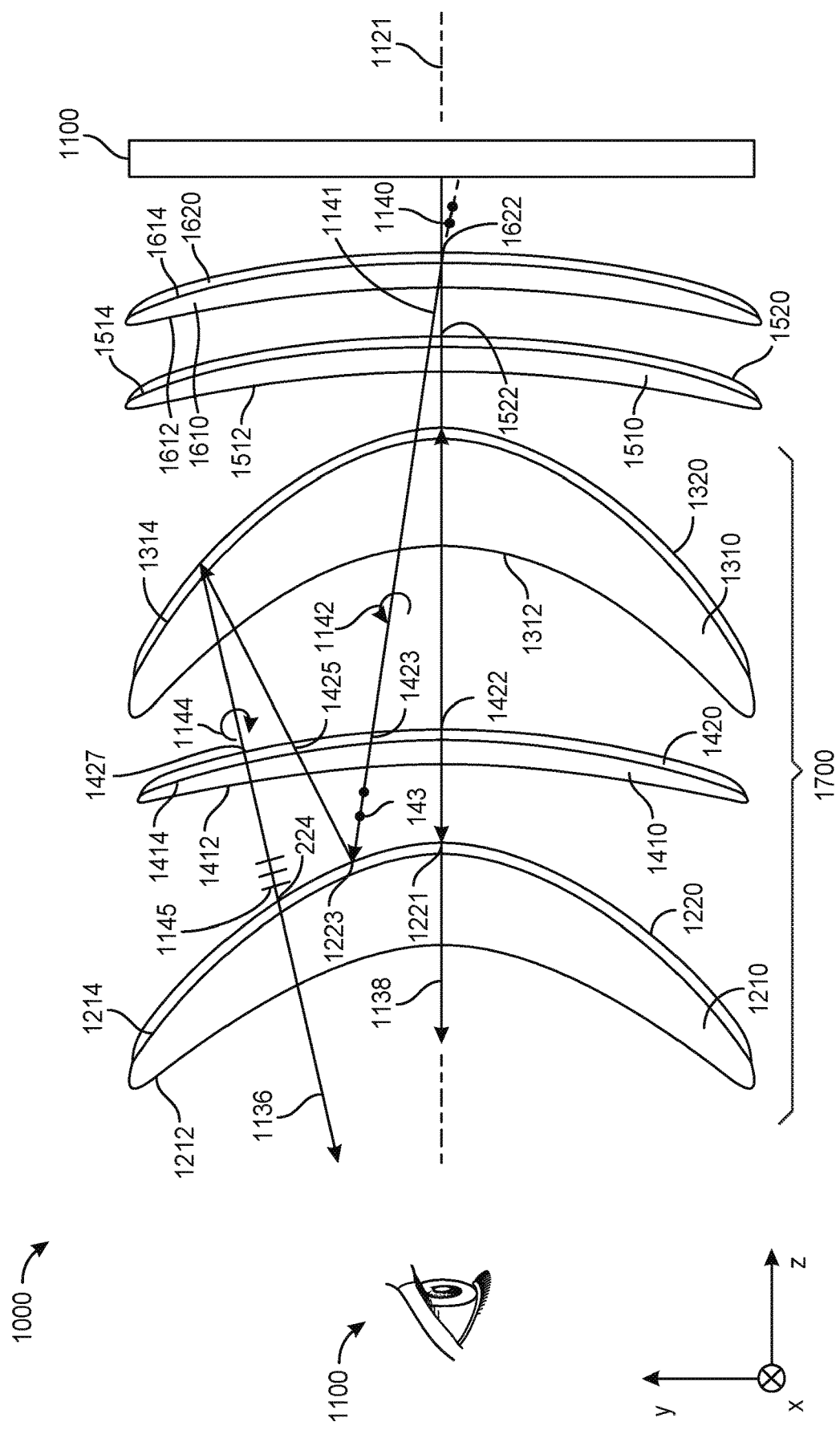
FIG. 7 is a schematic cross-sectional view of an embodiment of an optical system incorporating the patterned optical retarders of the present disclosure.

FIG. 7 is a schematic cross-sectional view of a non-limiting example of a compact folded optical system 1000 in which the patterned retarders of the present disclosure can be particularly useful. Optical system 1000 includes optical lenses 1210, 11410, 310, 11510, and 1610, a reflective polarizer layer 1220 (also referred to as a "reflective polarizer"), a partial reflector layer 1320 (also referred to as a "partial reflector"), a first retarder layer 1420, a second retarder layer 1520, and a third retarder layer 1620 (also referred to as a "first retarder", a "second retarder", and a "third retarder", respectively).

In the example of FIG. 7, object 1100 emits a light ray 1136 having a polarization state 1140. After passing through third retarder layer 1620, light ray 1136 has polarization state 1141; then, after passing through second retarder layer 1520 and partial reflector layer 1320, light ray 1136 has polarization state 1142; then, after passing through first retarder layer 1420, light ray 1136 has polarization state 1143 when first incident on reflective polarizer layer 1220; then, after passing back through first retarder layer 1420 and reflecting from partial reflector layer 1320, light ray 1136 has polarization state 1144; and then light ray 1136 passes again through first retarder layer 1420 to polarization state 1145 and is second incident on reflective polarizer layer 1220.

FIG. 7 also schematically illustrates light ray 1138. Light ray 1138 propagates along optical axis 11121 and passes through the retarder layer 1520 at an origin 1522, passes through retarder layer 1420 at an origin 1422 and passes through reflective polarizer 1220 at origin 1221. Polarization states 1140 and 1143 are schematically depicted in FIG. 7 as having an electric field polarized in the x-direction, referring to the x-y-z coordinate system depicted in FIG. 7. However, either or both polarization states may be some state other than linearly polarized along the x-direction. For example, if polarization state 1141 is linearly polarized, the polarization state 1143 may be elliptically polarized depending on the retardances of the retarder layers 1420, 1520, 1620.

The components of optical system 1000 may be disposed on one or more major surfaces of optical lenses 1210, 1310, 1410, 1510, and 1610. In other embodiments, one or more of reflective polarizer layer 1220, partial reflector layer 1320, and retarder layers 1420, 1520, and 1620, are disposed on a different major surface than shown in the embodiment illustrated FIG. 7. For example, any one or more of reflective polarizer layer 1220, partial reflector layer 1320, and retarder layers 1420, 1520, and 1620, can be disposed on the opposite major surface of the respective lens. As another example, one or more of these layers may be disposed on another one of these layers. Optical lens 1210 has opposing first and second major surfaces 1212 and 1214, optical lens 1310 has opposing first and second major surfaces 1312 and 1314, optical lens 1410 has opposing first and second major surfaces 1412 and 1414, optical lens 1510 has opposing first and second major surfaces 1512 and 1514, and optical lens 1610 has opposing first and second major surface 1612 and 1614.

Optical system 1000 has an optical axis 1121. The optical axis of an optical system, display system, or optical lens or optical element in an optical system, can be understood as an axis near the center of the system, lens, or optical element where a light ray propagating along the optical axis passes through the lens(es) and/or optical element(s) with a minimum degree of refraction so that light propagating along axes close to but different from the optical axis experience greater degrees of refraction. In some embodiments, each of the one or more optical lenses 1210, 1310, 1410, 1510, 1610, is centered on optical axis 1121 through an apex of each of the one or more optical lenses 1210, 1310, 1410, 1510, 1610. The light ray along optical axis 1121 may pass through the optical lens(es) and/or optical element(s) without being refracted or without being substantially refracted, such that the angle between a light ray incident on a surface and a light ray transmitted through the surface is no more than 15 degrees at any major surface of the optical system.

In some embodiments, optical system 1000 displays an object 1100 to a viewer 1110. The object 1100 may be a display or an image on a display, for example. Suitable displays include liquid crystal displays (LCDs) and organic light emitting diode (OLED) displays, for example. Alternatively, the object 1100 may be some object other than a display such as an object in the environment of the viewer 1110. In embodiments in which object 1100 is a display, the optical system 1000 together with the display may be referred to as a display system or alternatively the optical system 1000 may be described as including the display. In some embodiments, object 1100 is a display panel producing a polarized light output. In some embodiments, a pre-polarizer is provided which polarizes light from object 1100 so that the light has the polarization state 1140 when incident on retarder layer 1620. In some embodiments, the object 1100 is an object in the environment of the viewer 1110 which emits light 1136 by reflecting ambient light towards optical system 1000.

Reflective polarizer layer 1220 and partial reflector layer 1320 may define a folded optical cavity 1700. The folded optical cavity 1700 may be configured to receive light at the first polarization state at either reflective polarizer layer 1220 or partial reflector layer 1320, reflect light at a surface of each of reflective polarizer layer 1220 and partial reflector layer 1320, and transmit light at the first polarization state from the other of reflective polarizer layer 1220 or partial reflector layer 1320 at which light was received. By reflecting light off both reflective polarizer layer 1220 and partial reflector layer 1320, light may be compressed (i.e. "folded") in a first direction or expanded in an opposite second direction. In some examples, folded optical cavity may be reversed, such that the relative positions of reflective polarizer layer 1220 and partial reflector layer 1320 relative to the viewer and object 1100 may be reversed from the example optical system 1000 of FIG. 7.

The devices of the present disclosure will now be further described in the following non-limiting examples.

EXAMPLES

Example 1

A glass wafer with a diameter of about 3 inches (7.6 cm) was coated with a 1.25 µm layer of a liquid crystal polymer (LCP) material ROF-5185 EXP 410 LCP, available from ROLIC Technologies Ltd. (Allschwil, Switzerland). At a wavelength of 550 nm, the coating had an average retardance of 121 nm.

A first mask of PET film was placed over a first region on the coating, and the masked coated glass wafer was placed in a reactive ion etching (RIE) apparatus and etched for 30 seconds with an oxygen-containing etch gas at an etch rate of about 5.5 nm per second.

The RIE apparatus was a capacitively coupled parallel plate plasma reactor, model type PD2480, manufactured by Plasma-Therm, St. Petersburg, Fla., operating at 13.56 MHZ and 2000 watts RF power. The first etching step with the first mask was performed in an oxygen (500 sccm gas flow) plasma at 80 mTorr plasma pressure. A second mask was then placed on a second region of the surface different from the first region, and the masked coated glass wafer was again etched for 60 seconds with the oxygen-containing etch gas at an etch rate of 5.5 nm per second.

The second etching step with the second mask was performed in an argon (300 sccm gas flow) plasma at 50 mTorr plasma pressure.

The results are shown in Table 1 below.

TABLE 1

| | Etching Time (sec) | Thickness (nm) (±10 nm) | Average Retardance (nm) (550 nm) | Average Surface Roughness (Ra) (nm) | RMS Surface Roughness (nm) |
|---|---|---|---|---|---|
| Control Region | None | 1250 | 121 | 0.75-1.50 | 1.25-1.75 |
| Mask 1 Region 1 | 30 | 1080 | 106 | 1.50-2.25 | 1.75-2.50 |
| Mask 2 Region 2 | 60 | 920 | 92 | 2.25-3.00 | 2.50-3.50 |

Figure 8:
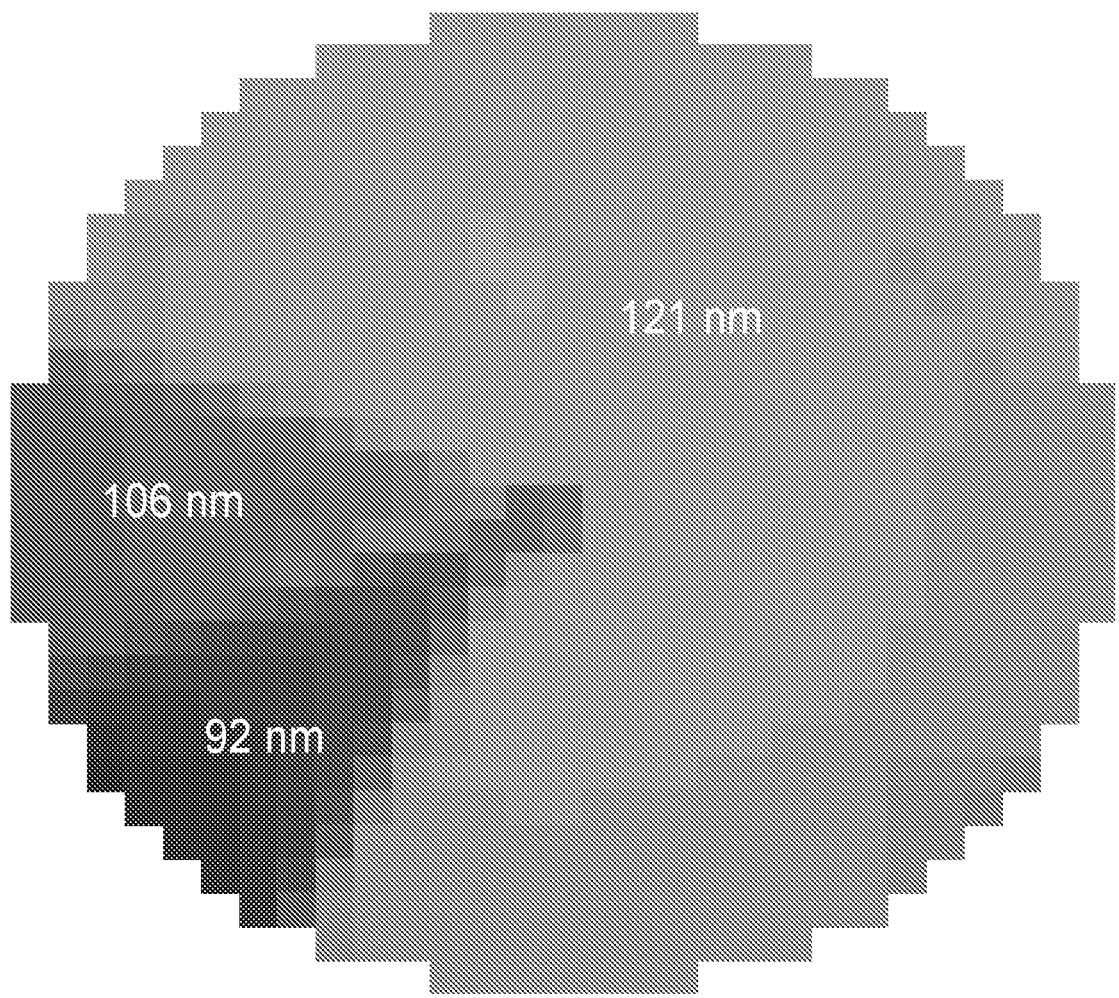
FIG. 8 is a plot of the optical retardance of the patterned optical retarder of Example 1.

A plot of the retardance of surface of the twice-etched LCP layer is shown in FIG. 8, as measured with a 550 nm source at normal incidence angles. In FIG. 8, the lightest region is the control region, the gray region is Region 1, and the black region is Region 2.

Figure 9A:
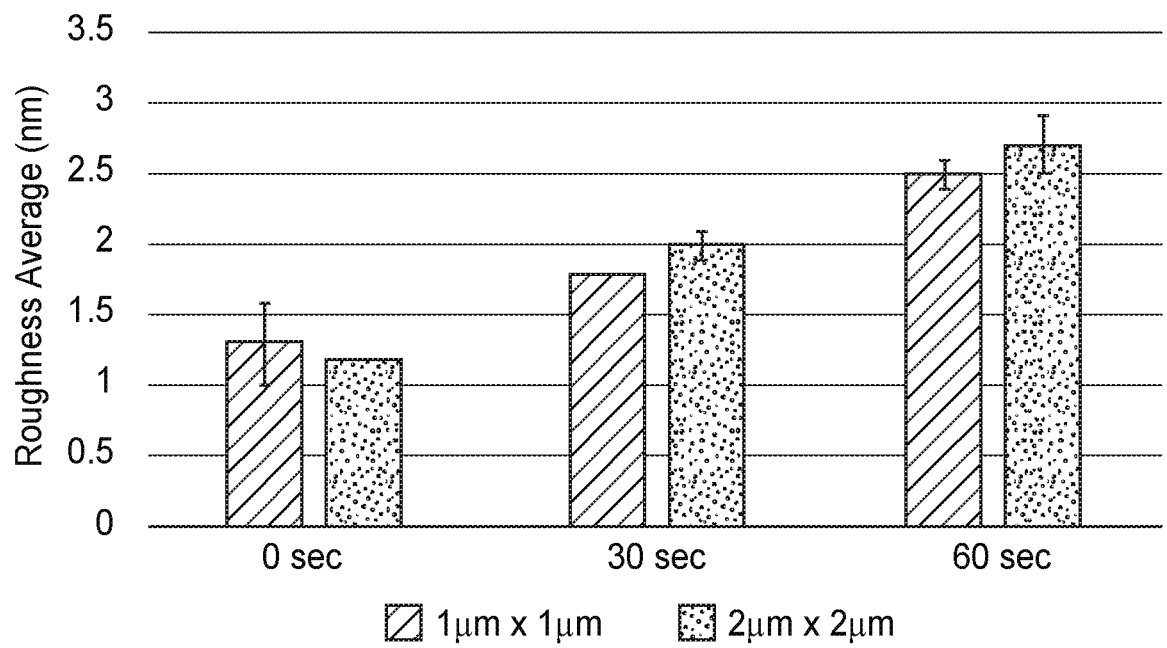
FIGS. 9A-9B are plots of the average surface roughness and RMS surface roughness of the patterned optical retarder of Example 1.
Figure 9B:
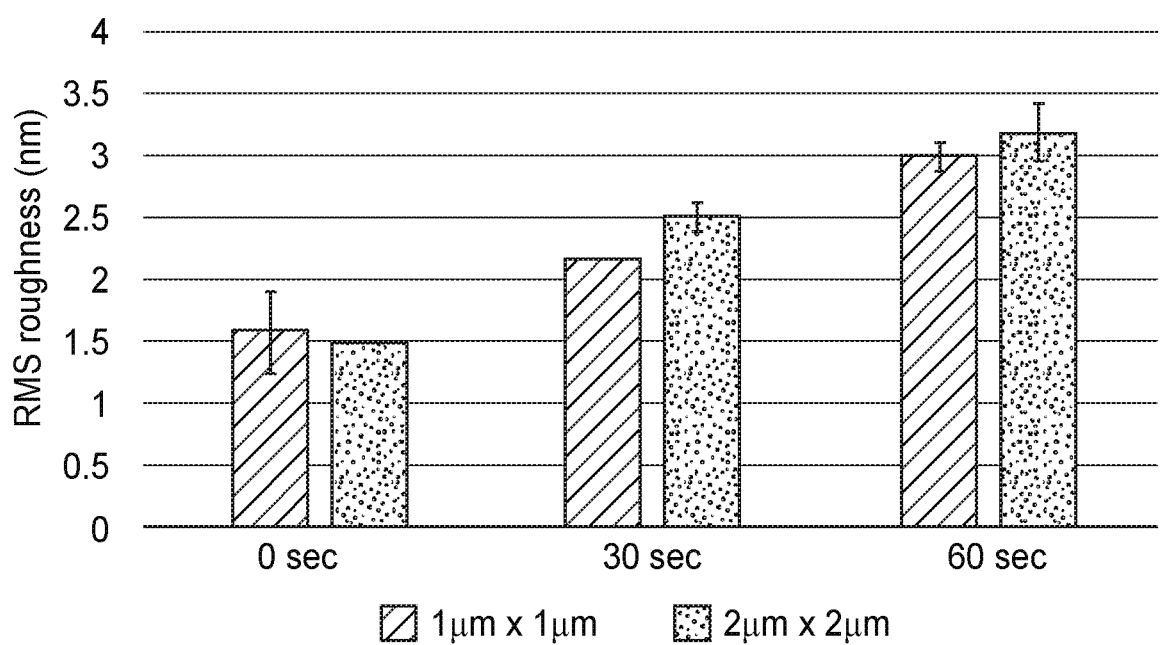

The surfaces of the etched regions of the twice-etched LCP layer were characterized using atomic force microscopy (AFM), and the results are shown in FIGS. 9A-9B. FIGS. 9A-9B show that the average surface roughness (Ra) and the root mean square surface roughness (RMS) both increased with etch time in both sample regions of 1 µm$^2$ and 2 µm$^2$. Following etching for 30 seconds, Region 1 had an average surface roughness of about 1.50-2.25 nm, and a RMS surface roughness of 1.75-2.25 nm. Increasing the etch time to 60 seconds in Region 2 increased the average surface roughness to 2.25-3.00 nm, and likewise increased the RMS surface roughness to 2.50-3.50 nm.

Figure 10A:
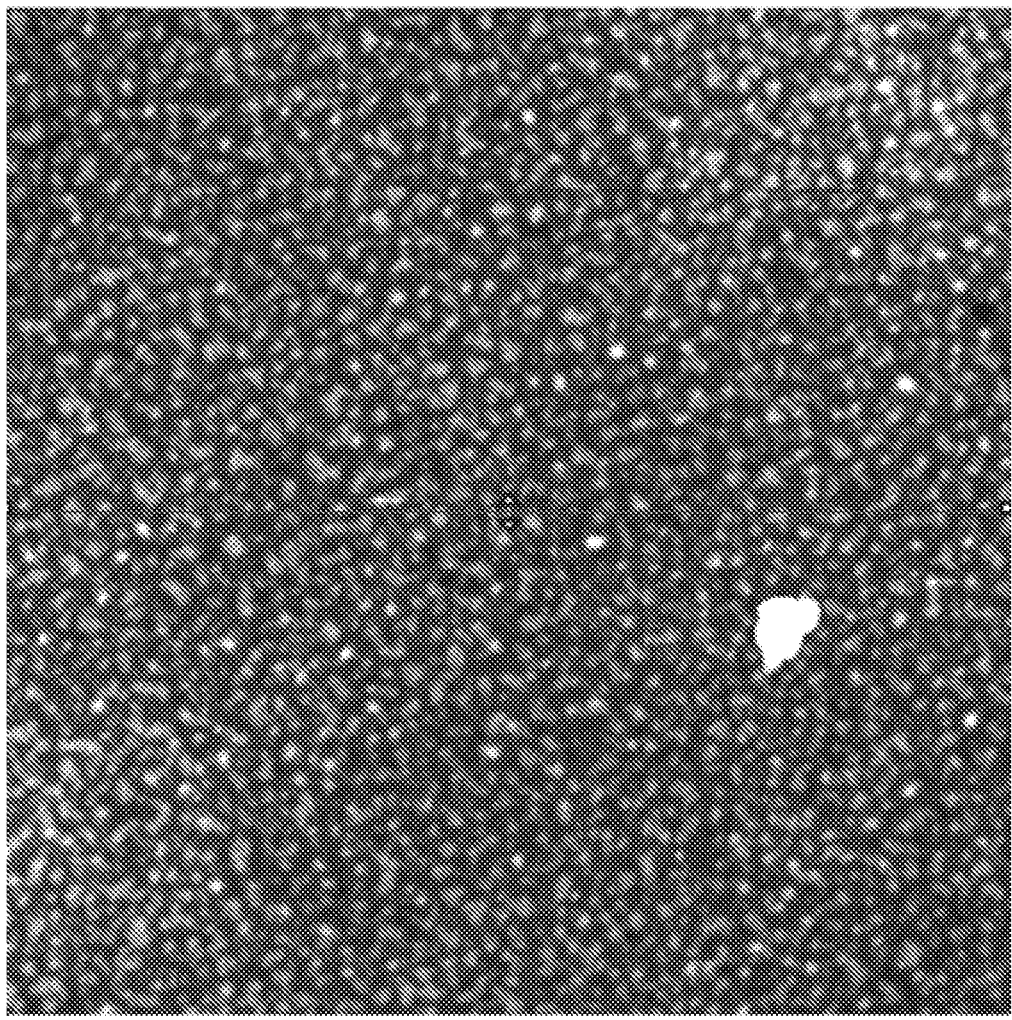
FIG. 10A is an image taken by an atomic force microscope (AFM) of a 2 μm×2 μm area of the unetched surface of the patterned optical retarder of Example 1.
Figure 10B:
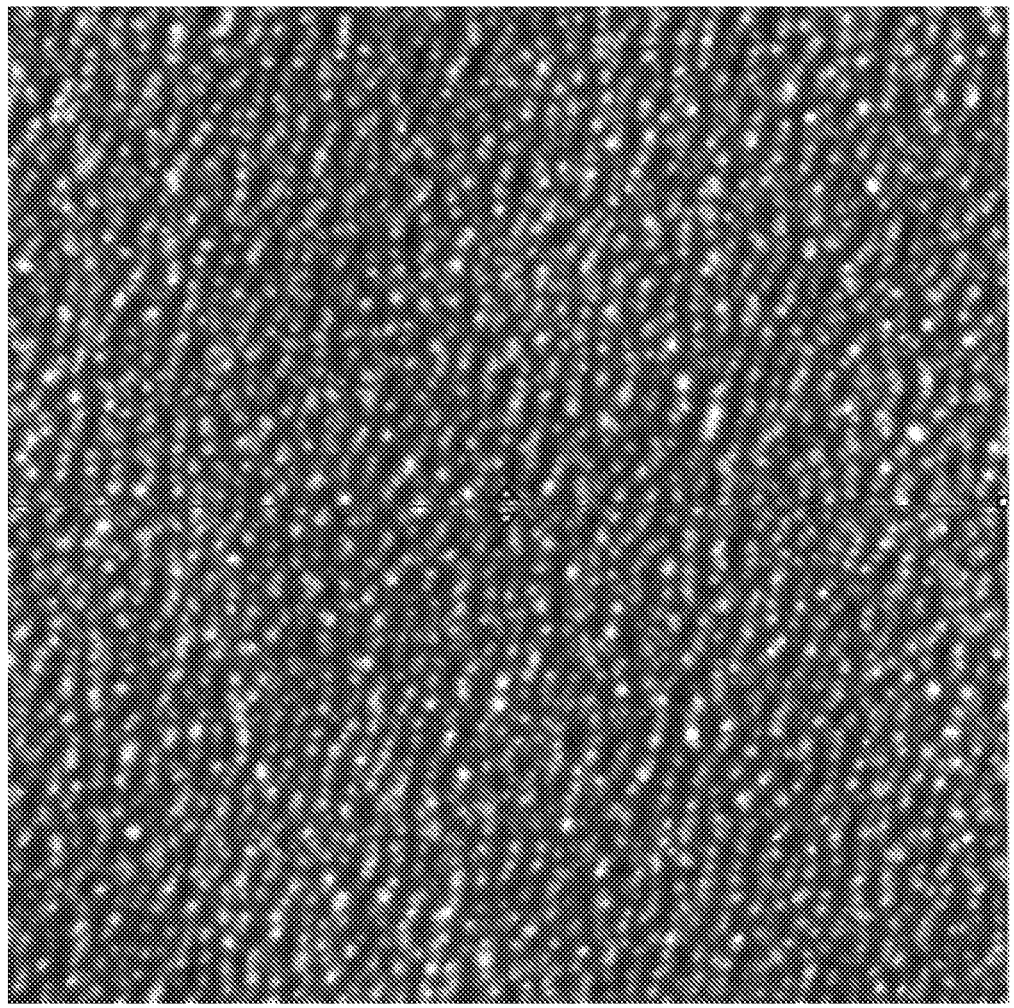
FIG. 10B is an image taken by an AFM of a 2 μm×2 μm area of the first region of the patterned optical retarder of Example 1, which was etched for 30 seconds.
Figure 10C:
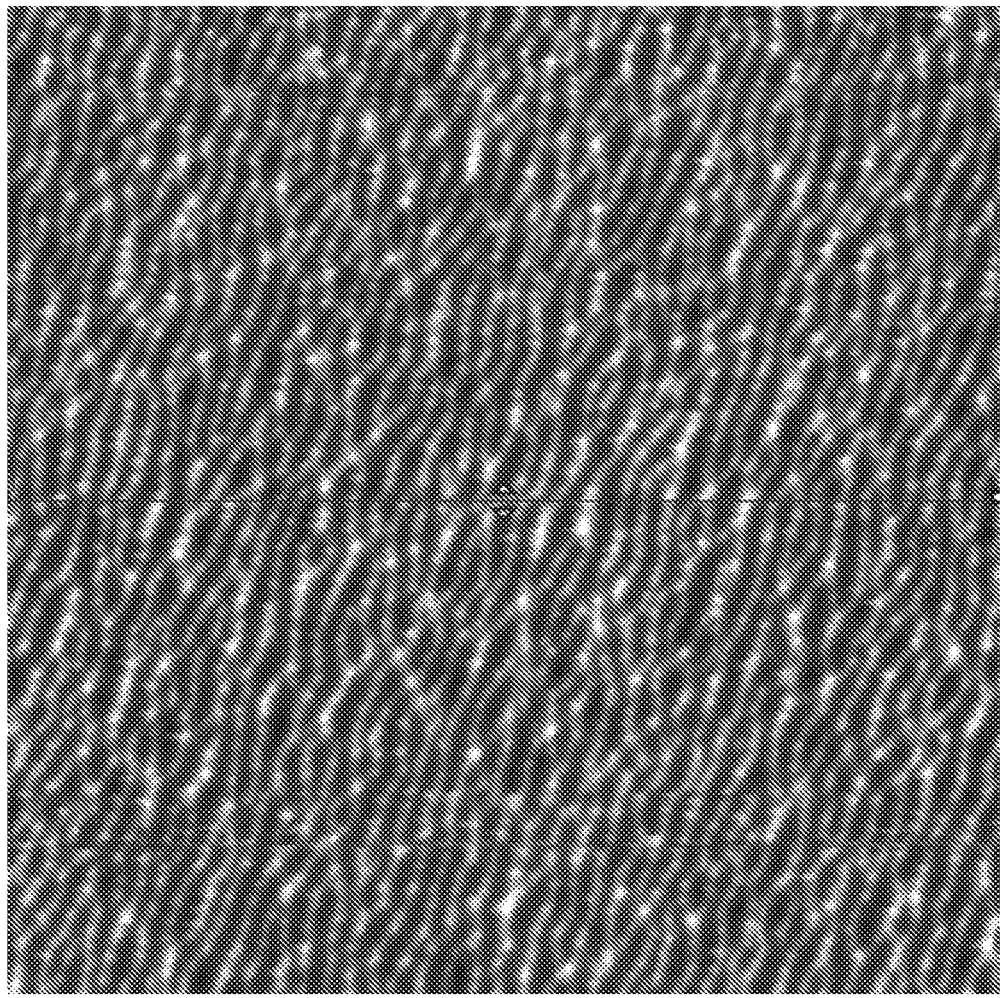
FIG. 10C is an image taken by an AFM of a 2 μm×2 μm area of the second region of the patterned optical retarder of Example 1, which was etched for 60 seconds.
Figure 11A:
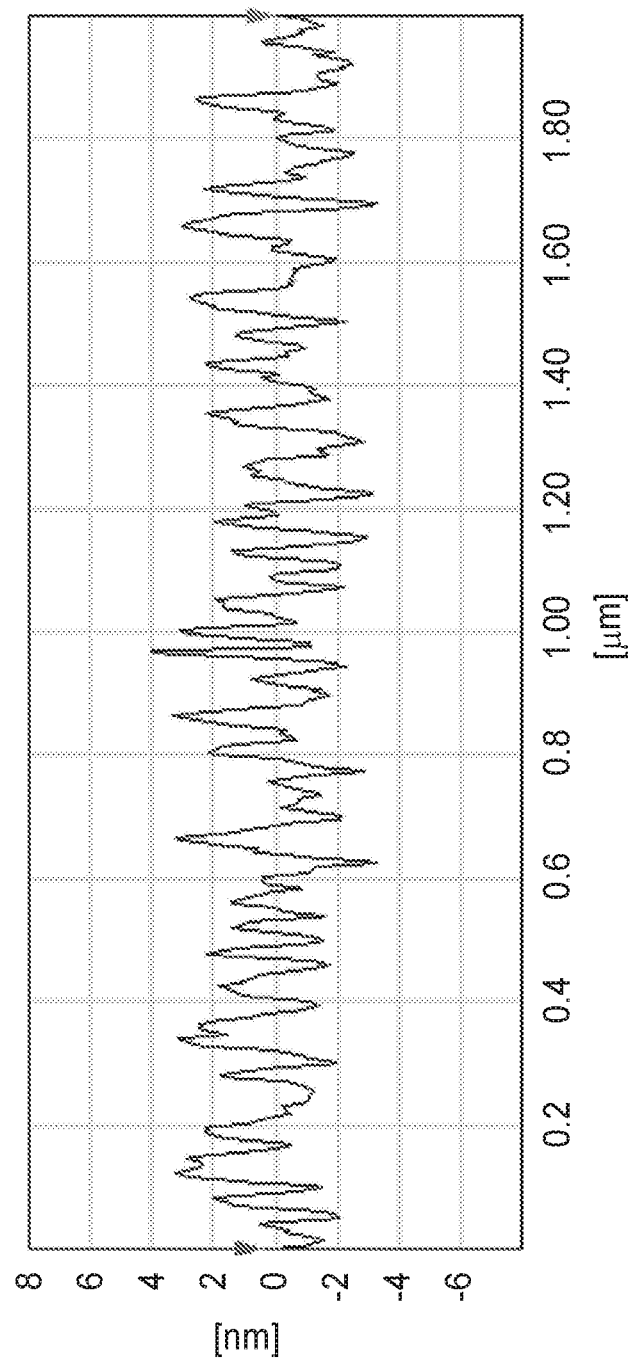
FIG. 11A is a line profile of the area of FIG. 10A.
Figure 11B:
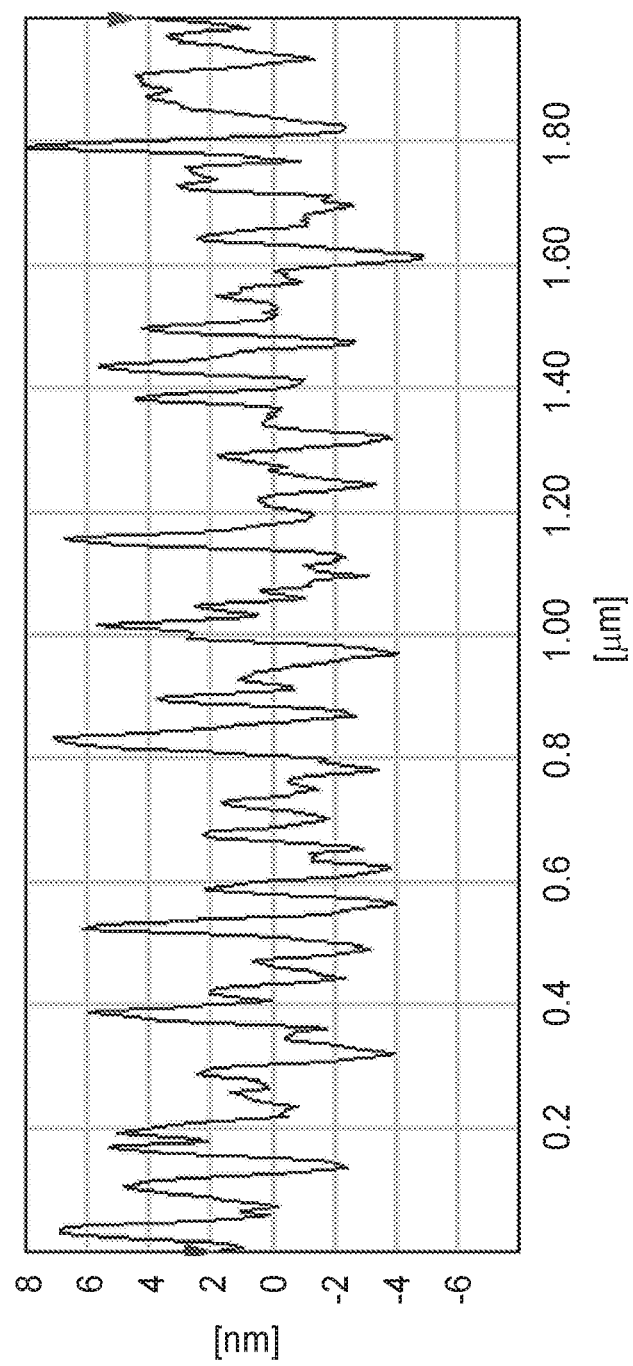
FIG. 11B is a line profile of the area of FIG. 10B.
Figure 11C:
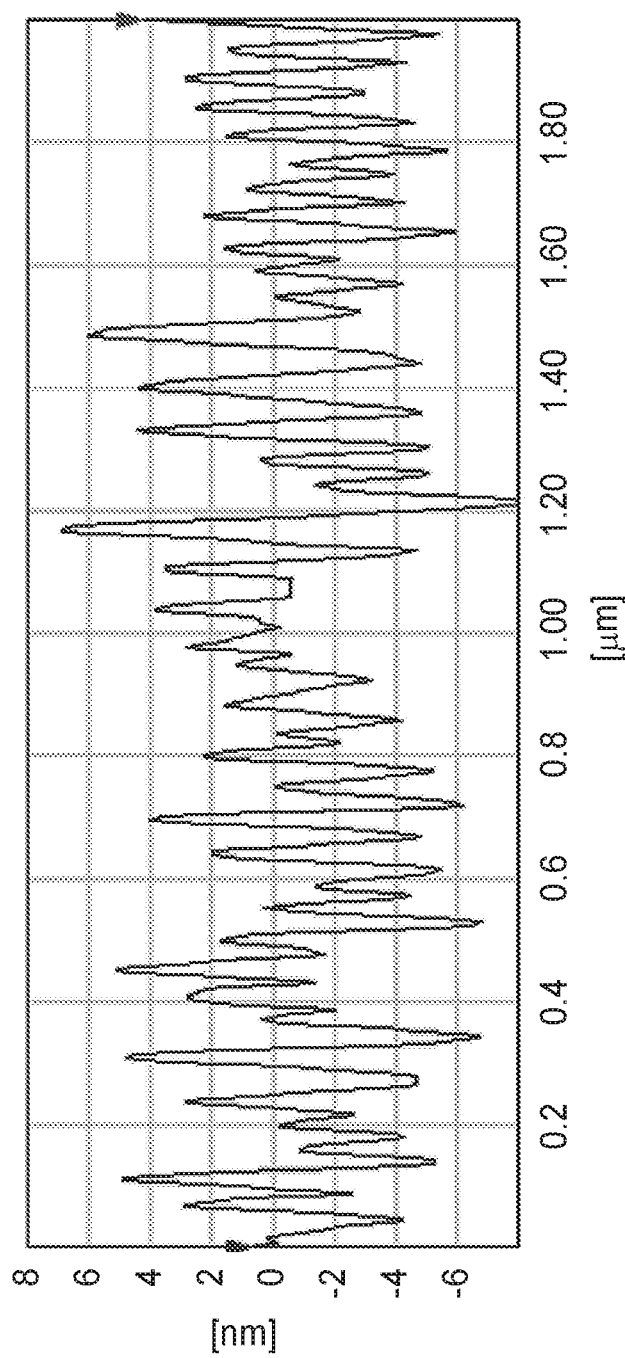
FIG. 11C is a line profile of the area of FIG. 10C.

Referring to the AFM images in FIGS. 10A-10C, as etch time increased, the surface of the LCP layer included more ridge-like projections. As shown in the line profiles of FIGS. 11A-11C, increased etch times increased the height of the ridges and the depth of the valleys between the ridges.

Figure 11D:
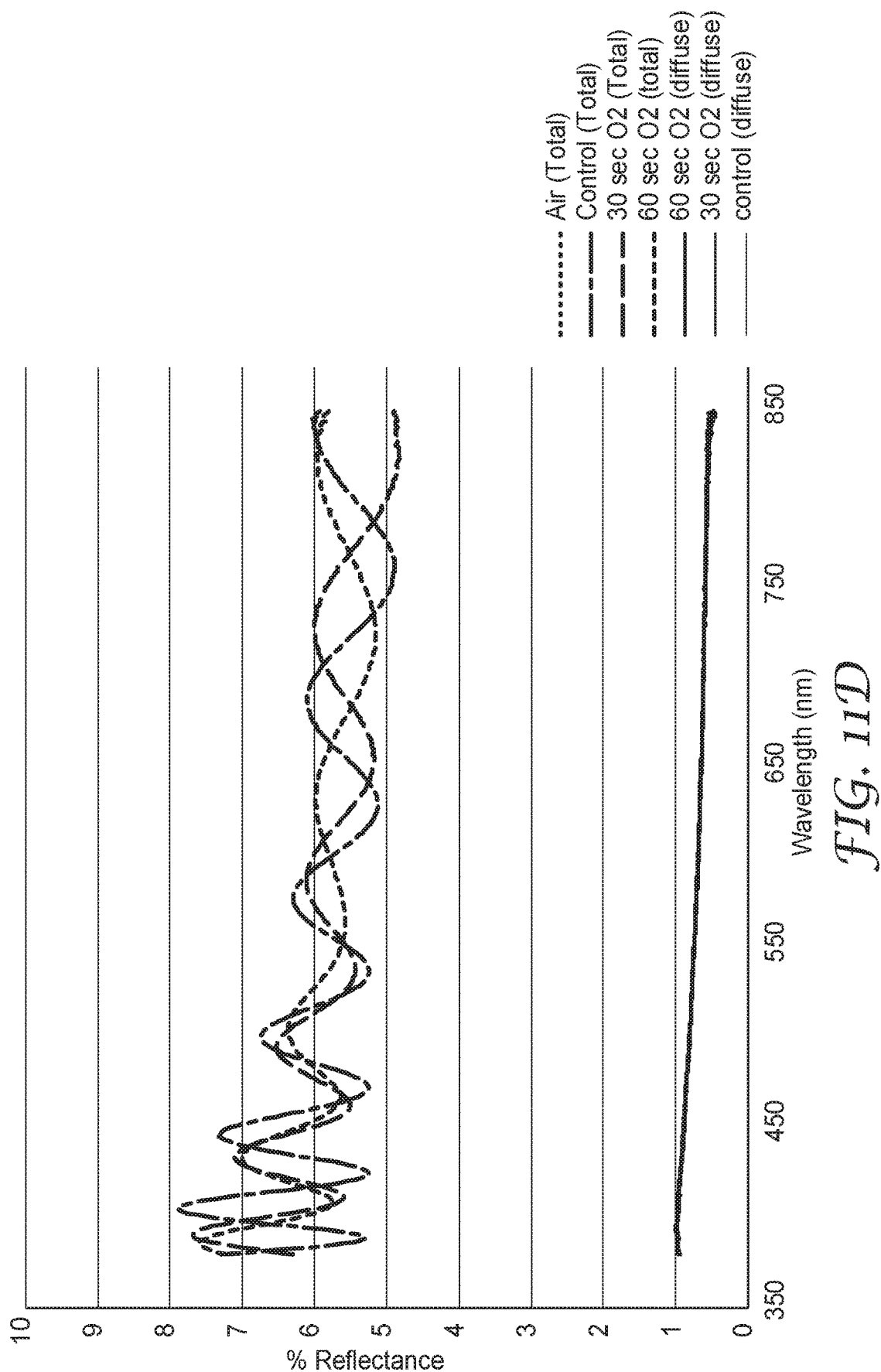
FIG. 11D is a plot showing the total and diffuse reflectance of the patterned retarder of Example 1.

Black tape was applied on the back surfaces of the samples. The total and diffuse reflectances of the control region of the unetched surface, Region 1 and Region 2 were measured, and the results are shown in FIG. 11D. The surfaces in the unetched control region, Region 1 and Region 2 showed substantially the same surface reflectance.

Example 2

The unetched glass wafers of Example 1 were masked with a first PET film placed over a first region on the coating, and the masked coated glass wafer was placed in the RIE apparatus of Example 1 and etched for 30 seconds with an argon-containing etch gas at an etch rate of about 5.5 nm per second.

A second mask was then placed on a second region of the surface different from the first region, and the masked coated glass wafer was again etched for 60 seconds with the argon-containing etch gas at an etch rate of 5.5 nm per second.

Figure 12A:
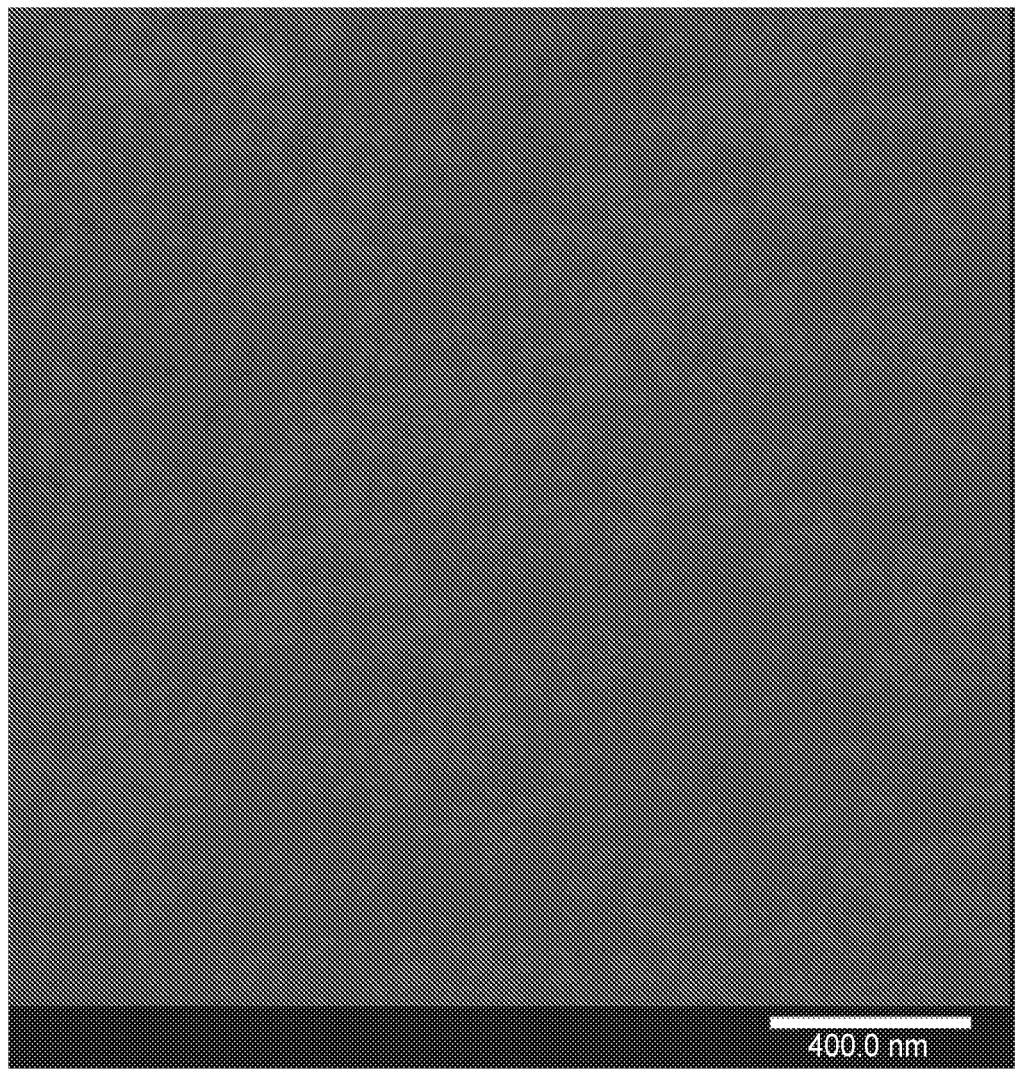
FIG. 12A is an image taken by an AFM of a 2 μm×2 μm area of the unetched surface of the patterned optical retarder of Example 2.
Figure 12B:
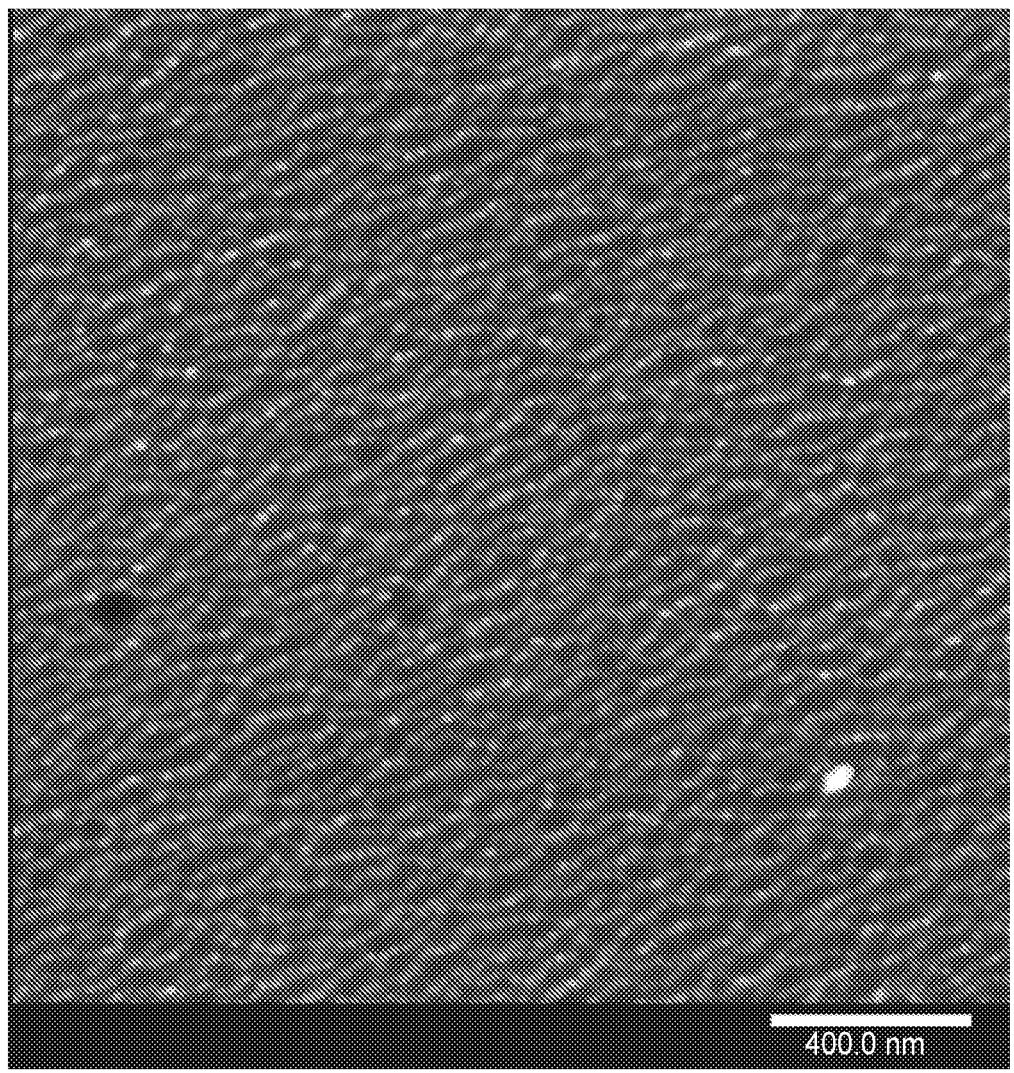
FIG. 12B is an image taken by an AFM of a 2 μm×2 μm area of the first region of the patterned optical retarder of Example 2, which was etched for 30 seconds.
Figure 12C:
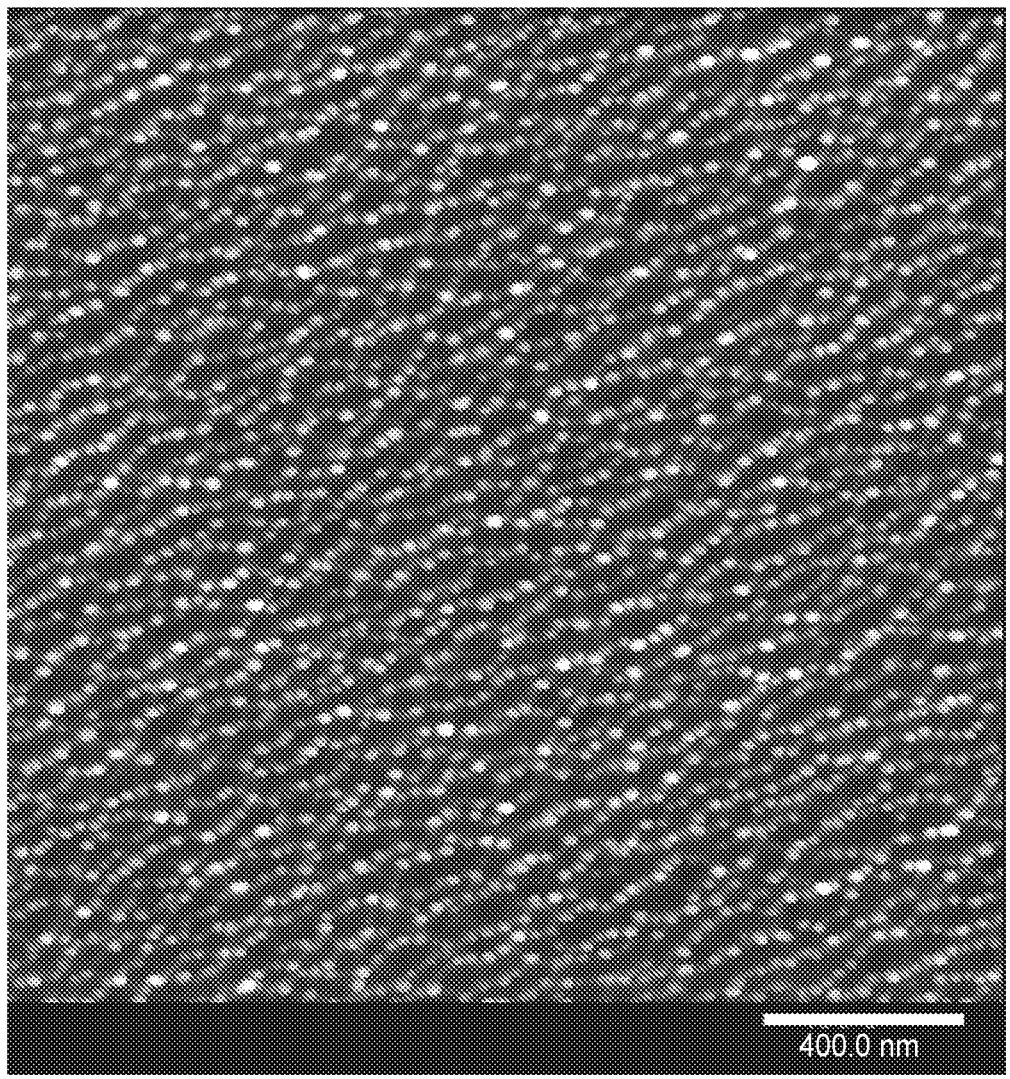
FIG. 12C is an image taken by an AFM of a 2 μm×2 μm area of the second region of the patterned optical retarder of Example 2, which was etched for 60 seconds.

Referring to the AFM images in FIGS. 12A-12C, as etch time increased, the surface of the LCP layer included more ridge-like projections.

Figure 13B:
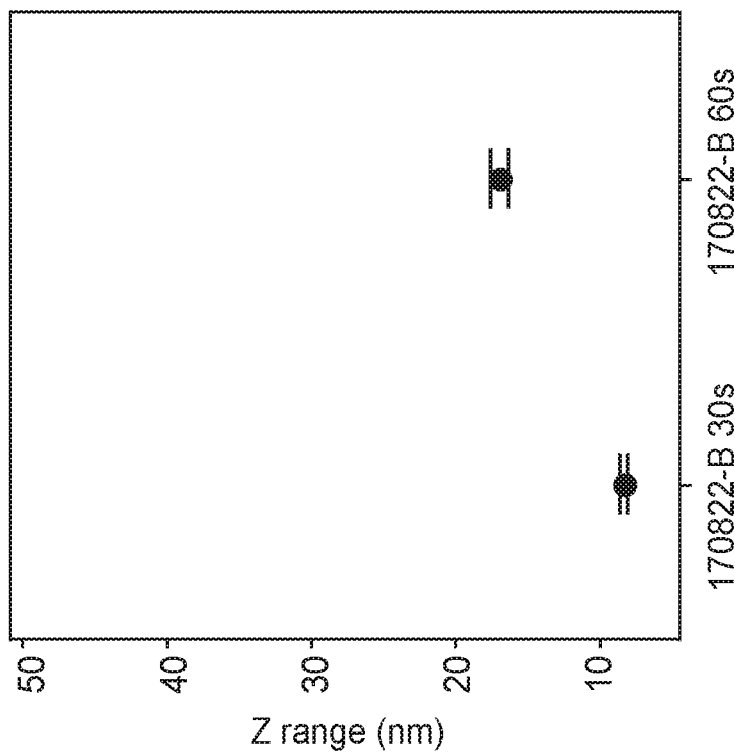
FIG. 13B is a plot of mean z-range in nm for the portions of the regions of FIGS. 12B and 12C.
Figure 13A:
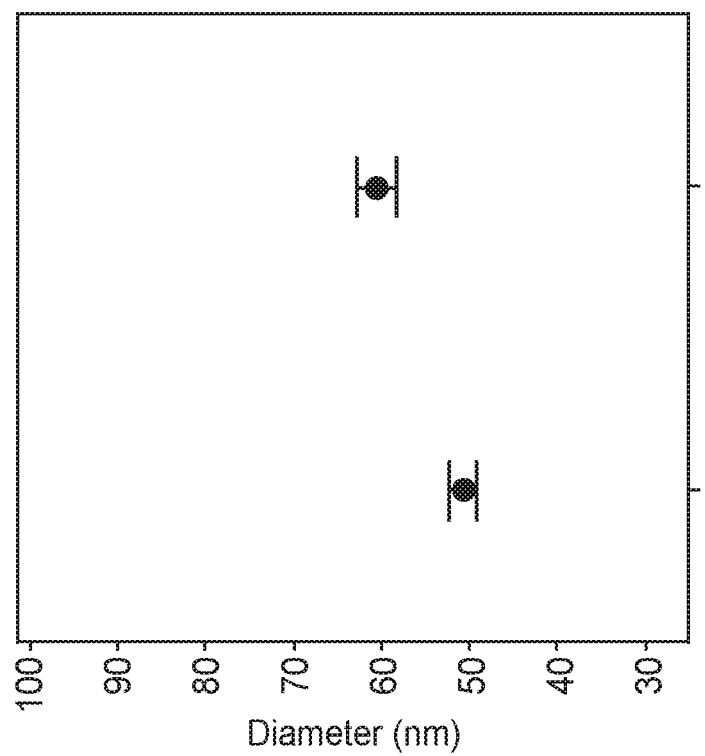
FIG. 13A is a plot of mean diameter in nm for the portions of the regions of FIGS. 12B and 12C.
Figure 14A:
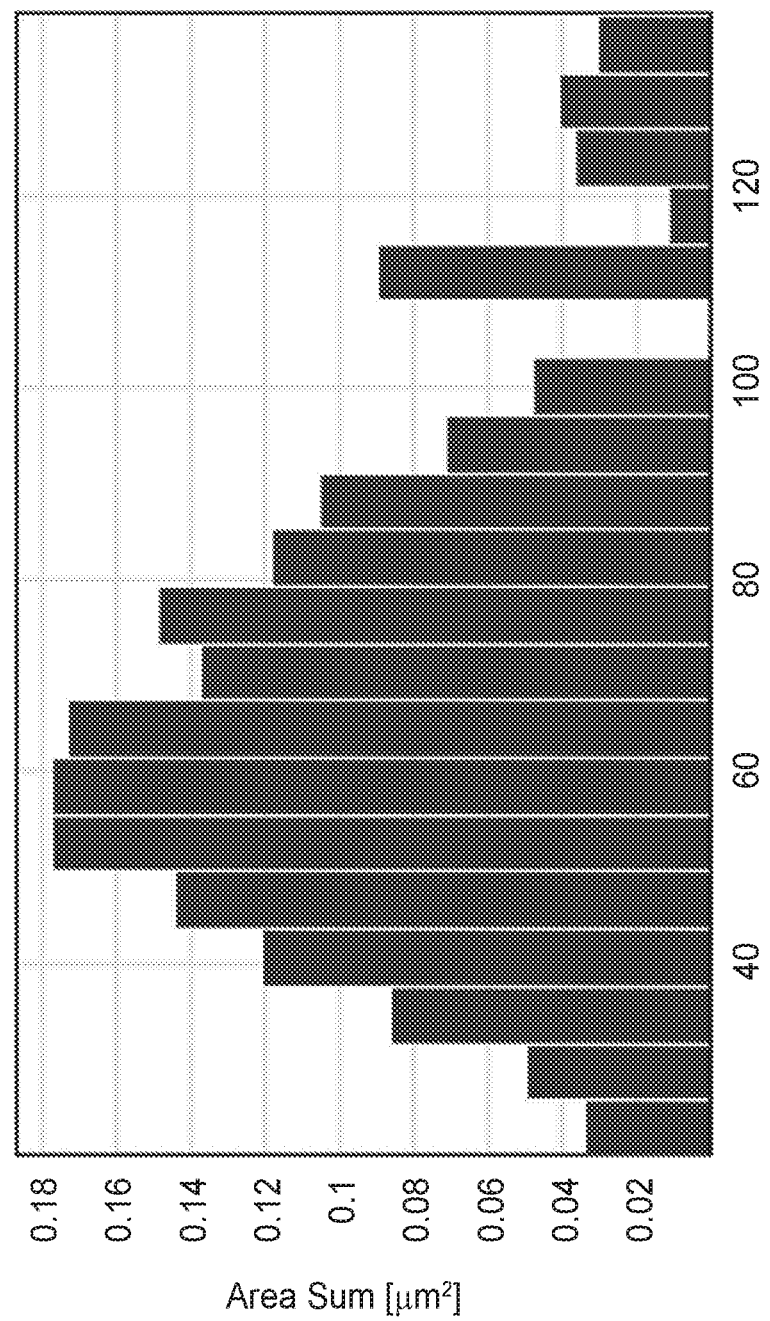
FIG. 14A is plot of area sum in $\mu m^2$ vs. diameter for the region of FIG. 12B.
Figure 15A:
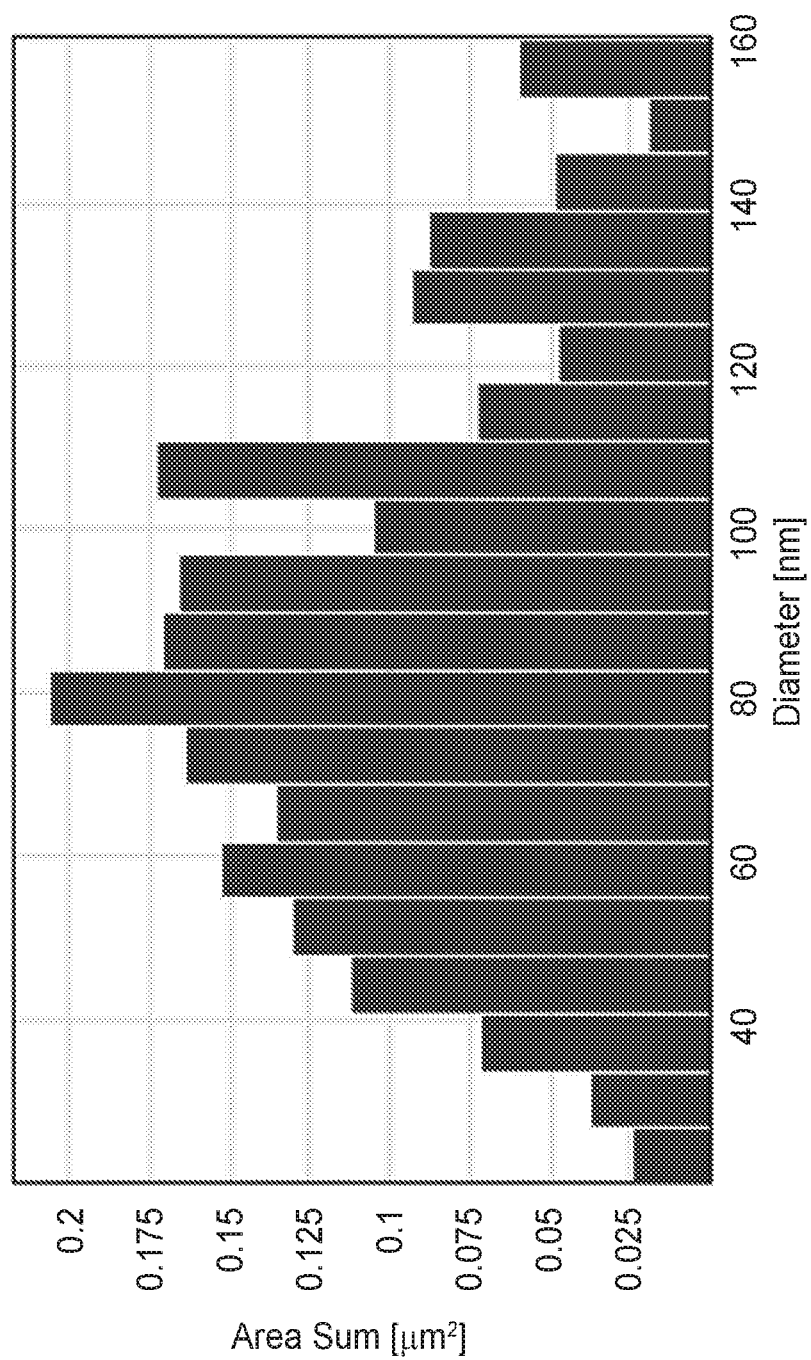
FIG. 15A is plot of area sum in $\mu m^2$ vs. diameter for the region of FIG. 12C.

As shown in FIG. 13A, the diameter of the structures in the surface of the coating, referred to as pores, had an approximate mean diameter of about 50 nm in the first region with the 30 second etch time and an approximate mean diameter of about 60 nm in the second region with the 60 second etch time, wherein diameter is defined as the diameter of a circle having an area equal to the area enclosed by the shape's contour (perimeter). The plot of area sum vs. diameter for the first region with the 30 second etch time are shown in FIG. 14A, while the plot of area sum vs. diameter for the second region with the 60 second etch time are shown in FIG. 15A.

Figure 14B:
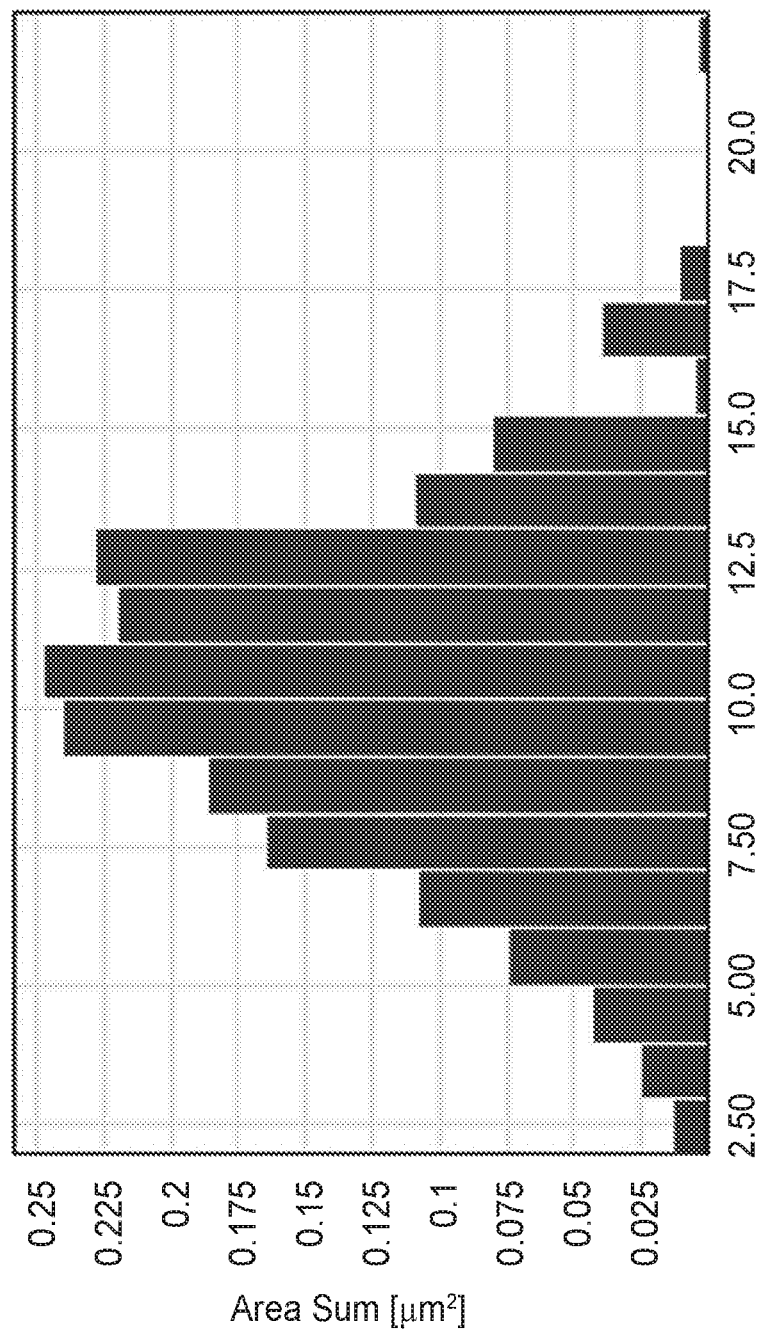
FIG. 14B is plot of area sum in $\mu m^2$ vs. z-range for the region of FIG. 12B.
Figure 15B:
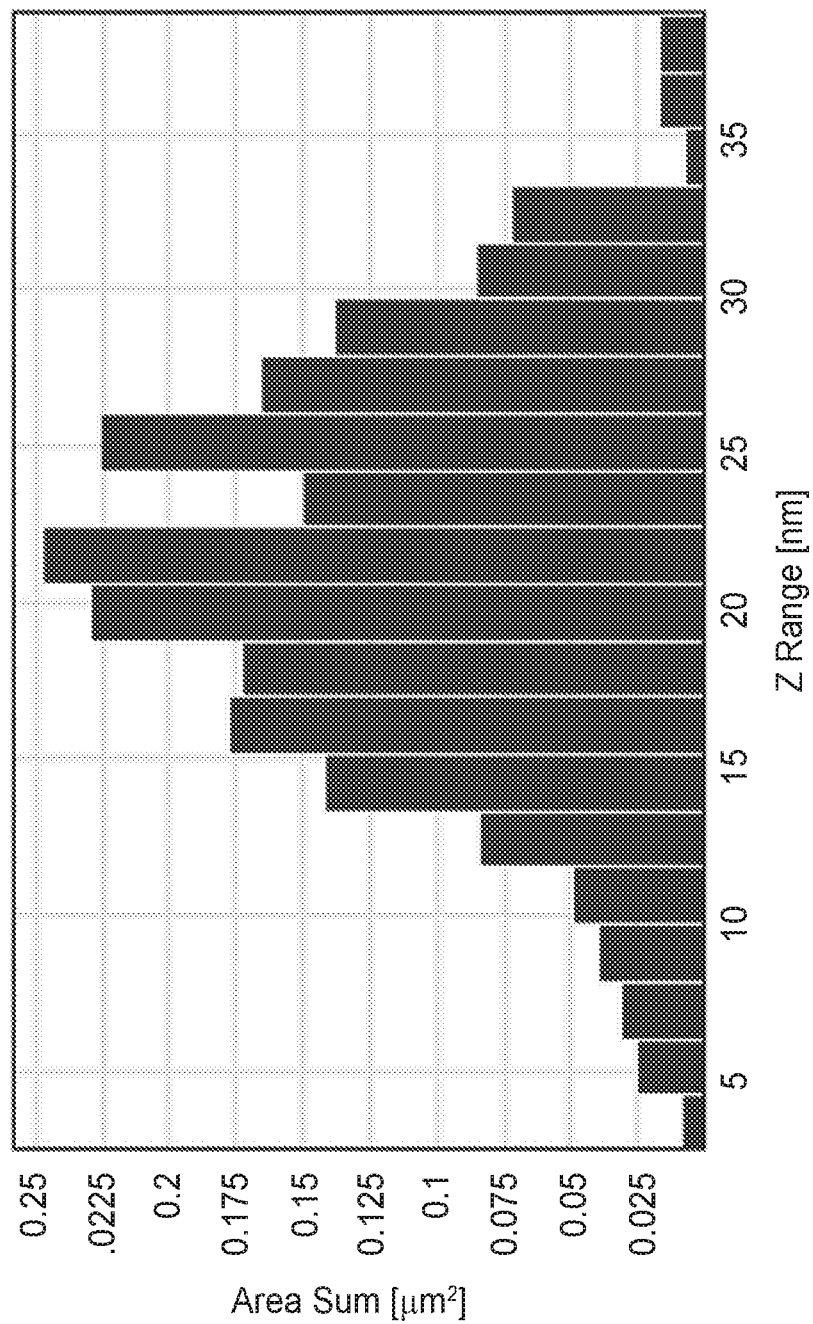
FIG. 15B is plot of area sum in $\mu m^2$ vs. z-range for the region of FIG. 12C.

Referring to FIG. 13B, height or depth of the ridge-like structures in the surface of the coating, again referred to as pores, had a z-range, referred to herein as the difference between the highest and lowest height and depth values of all points inside the shape contour, of about 5-7 nm in the first region with the 30 second etch time and about 15-20 nm in the second region with the 60 second etch time. The plot of area sum vs. z-range for the first region with the 30 second etch time are shown in FIG. 14B, while the plot of area sum vs. z-range for the second region with the 60 second etch time are shown in FIG. 15B.

Figure 16:
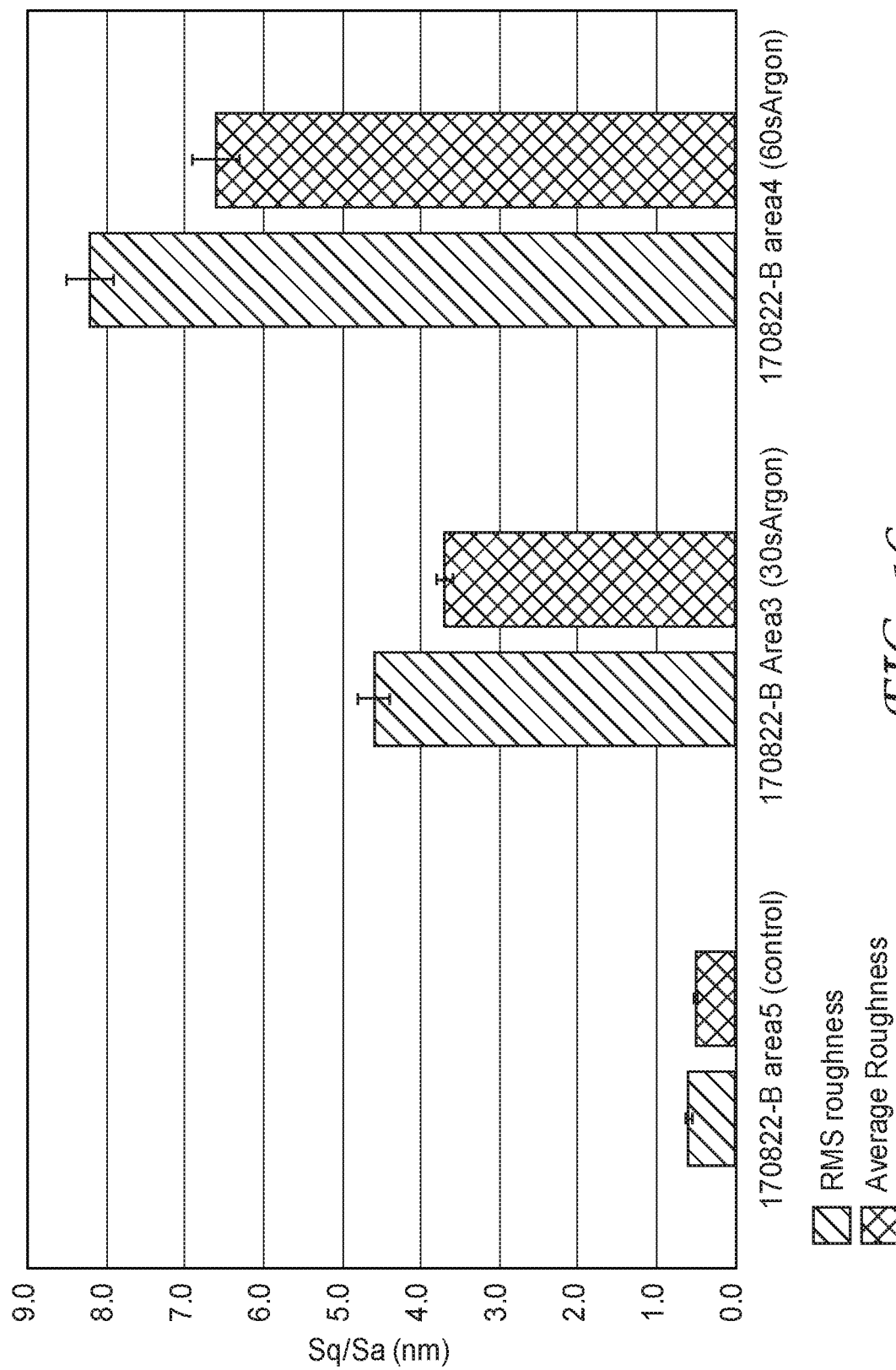
FIG. 16 is a plot of the average surface roughness and RMS surface roughness of the patterned optical retarder of Example 2.

The surfaces of the etched regions of the twice-etched LCP layer were further characterized using AFM, and the results are shown in FIG. 16. FIG. 16 show that the average surface roughness (Ra) and the root mean square surface roughness (RMS) both increased with etch time in sample regions of 2 μm². The unetched surface had an average surface roughness of about 0.5 nm and a RMS surface roughness of about 0.6 nm. Following etching for 30 seconds, Region 1 had an average surface roughness of about 4 nm, and a RMS surface roughness of about 5 nm. Increasing the etch time to 60 seconds in Region 2 increased the average surface roughness to about 7 nm, and likewise increased the RMS surface roughness to about 8 nm.

The following are a list of embodiments of the present disclosure.

Embodiment 1 is a patterned optical retarder comprising non-overlapping first and second regions comprising respective first and second major surfaces having different RMS surface roughnesses, wherein for substantially normally incident light over a wavelength (λ) range from about 400 nm to about 1000 nm, the optical retarder has different retardances in the respective first and second regions.

Embodiment 2 is the patterned optical retarder of embodiment 1, wherein the retarder comprises a plurality of optical retarder layers, and wherein the first and second regions are limited to a single optical retarder layer in the plurality of optical retarder layers.

Embodiment 3 is a multilayer optical retarder comprising the patterned optical retarder layer of embodiment 1 disposed on another optical retarder layer.

Embodiment 4 is the patterned optical retarder of embodiment 1 having a thickness in a range from about 0.2 microns to about 2 microns, the first region having a thickness that is less than the thickness of the retarder layer by about 50 to about 500 nm, and the second region having a thickness that is less than the thickness of the first region by about 20 to about 500 nm.

Embodiment 5 is the patterned optical retarder of embodiment 1, wherein the RMS surface roughness of the first major surface is about 2 to about 2.5 nm, and the RMS surface roughness of the second major surface is about 3 to about 3.5 nm.

Embodiment 6 is the patterned optical retarder of embodiment 1, wherein the first and the second regions are spaced apart.

Embodiment 7 is the patterned optical retarder of embodiment 1, wherein the first and the second regions are spaced apart by at least 500 nm.

Embodiment 8 is the patterned optical retarder of embodiment 1, wherein the first and the second regions are laterally adjacent to each other.

Embodiment 9 is the patterned optical retarder of embodiment 1, further comprising a transition region between the first and the second regions, wherein the transition region has a width of about 5 μm to about 10 mm.

Embodiment 10 is the patterned optical retarder of embodiment 9, wherein the transition region has a width of about 1 mm to about 5 mm.

Embodiment 11 is the patterned optical retarder of embodiment 1, wherein for a predetermined wavelength $\lambda_0$ of normally incident light in the wavelength (λ) range from about 400 nm to about 1000 nm, the difference in the optical retardance between the first and the second regions is less than about $0.5\lambda_0$.

Embodiment 12 is the patterned optical retarder of embodiment 11, wherein the difference in the optical retardance between the first and the second regions is less than about $0.2\lambda_0$.

Embodiment 13 is the patterned optical retarder of embodiment 1, wherein the difference in the retardance between the first and the second regions is greater than 20%.

Embodiment 14 is the patterned optical retarder of embodiment 1, wherein the difference in the retardance between the first and the second regions is greater than 10%.

Embodiment 15 is the patterned optical retarder of embodiment 1, wherein the optical retarder comprises a single layer.

Embodiment 16 is the patterned optical retarder of embodiment 1, wherein the first and second regions each have an average surface roughness that varies less than about 20% over a 2 μm square test area.

Embodiment 17 is the patterned optical retarder of embodiment 1, wherein the first and second regions each have an average surface roughness that varies less than about 5% over a 2 μm square test area.

Embodiment 18 is an optical element comprising an optical component with a patterned optical retarder thereon, the patterned optical retarder comprising non-overlapping first and second regions comprising respective first and second major surfaces having different RMS surface roughnesses, wherein for substantially normally incident light over a wavelength (λ) range from about 400 nm to about 1000 nm, the optical retarder has different retardances in the respective first and second regions.

Embodiment 19 is the optical element of embodiment 18, wherein the optical component has a non-zero optical power.

Embodiment 20 is the optical element of embodiment 18, wherein the optical component is a second optical retarder.

Embodiment 21 is the optical element of embodiment 20, wherein the second optical retarder comprises non-overlapping first and second regions comprising respective first and second major surfaces having different RMS surface roughnesses, wherein for substantially normally incident light over a wavelength (λ) range from about 400 nm to about 1000 nm, the second optical retarder has different retardances in the respective first and second regions.

Embodiment 22 is the optical element of embodiment 18, wherein the optical component is a polarizer.

Embodiment 23 is the optical element of embodiment 22, wherein the polarizer is chosen from linear polarizers and circular polarizers.

Embodiment 24 is the optical element of embodiment 18, wherein the optical component is a lens.

Embodiment 25 is a method for making an optical element, the method comprising: in a polymeric optical retarder layer with a substantially uniform retardance δ for substantially normally incident light over a predetermined wavelength λ from about 400 nm to about 1000 nm and comprising a surface, etching at least one first region of the surface such that the polymeric optical retarder layer comprises a non-zero retardance difference θ from δ in the at least one first region of the surface; and conforming the polymeric optical retarder layer to a surface of an optical component.

Embodiment 26 is the method of embodiment 25, wherein the surface of the optical component has a non-zero optical power.

Embodiment 27 is the method of embodiment 25, wherein the optical component is chosen from a polarizer, a lens, and a second optical retarder.

Embodiment 28 is the method of embodiment 27, wherein the polarizer is chosen from circular polarizers and linear polarizers.

Embodiment 29 is the method of embodiment 27, wherein the second optical retarder has a non-uniform optical retardance.

Embodiment 30 is the method of embodiment 25, wherein θ is less than about 0.2λ.

Embodiment 31 is the method of embodiment 25, wherein the surface of the optical retarder layer comprises a plurality of regions with a substantially uniform retardance difference θ from δ.

Embodiment 32 is the method of embodiment 25, wherein the first region covers at least 20% of a surface area of the optical retarder layer.

Embodiment 33 is the method of embodiment 25, wherein the surface of the optical retarder layer comprises a first region with a retardance difference θ+ greater than δ and a second region with a retardance difference θ− less than δ.

Embodiment 34 is the method of embodiment 25, wherein the surface of the optical retarder layer has a substantially uniform physical thickness Λ, and wherein the region has a physical thickness difference ε from Λ greater than zero.

Embodiment 35 is the method of embodiment 25, wherein the surface of the optical retarder comprises at least one first region with a first thickness and at least one second region with a second physical thickness different from the first physical thickness.

Embodiment 37 is the method of embodiment 25, wherein the first region is a right triangle.

Embodiment 38 is the method of embodiment 25, wherein the first region is a circle quadrant.

Embodiment 39 is the method of embodiment 25, wherein the retarder is a quarter wave retarder.

Embodiment 40 is the method of embodiment 25, wherein the etching is chosen from wet etching and dry etching.

Embodiment 41 is the method of embodiment 40, wherein the dry etching is chosen from plasma etching, reactive ion etching, and combinations thereof.

Embodiment 42 is the method of embodiment 25, wherein the etching is reactive ion etching with a plasma source chosen from charged moieties and neutral moieties.

Embodiment 43 is the method of embodiment 42, wherein the plasma source is a charged moiety.

Embodiment 44 is the method of embodiment 42, wherein the plasma source comprises oxygen.

Embodiment 45 is the method of embodiment 42, wherein the plasma source is a neutral moiety.

Embodiment 46 is the method of embodiment 45, wherein the neutral moiety comprises argon.

Embodiment 47 is the method of embodiment 25, wherein the etching comprises multiple etching steps.

Embodiment 48 is the method of embodiment 25, wherein the etching comprises etching the surface through a mask.

Embodiment 49 is the method of embodiment 47, wherein the etching comprises etching the surface through a mask.

Embodiment 50 is the method of embodiment 25, wherein the surface of the optical component has a radius of curvature greater than 5 mm and less than 1000 mm.

Embodiment 51 is the method of embodiment 25, wherein the polymeric optical retarder layer comprises a polymeric film.

Embodiment 52 is the method of embodiment 51, wherein the polymeric film is birefringent.

Embodiment 53 is the method of embodiment 51, wherein the polymeric film comprises a plurality of layers.

Embodiment 54 is the method of embodiment 25, wherein the polymeric optical retarder layer is chosen from photo-polymerizable polymers (LPP), liquid crystal polymers (LCP), and combinations thereof.

Embodiment 55 is the method of embodiment 25, wherein the optical component is a lens.

Embodiment 56 is the method of embodiment 55, wherein the lens is chosen from, plano-convex, plano-concave, biconvex, positive meniscus, negative meniscus, gradient index, Fresnel, and combinations thereof.

Embodiment 57 is a method for making an optical element, the method comprising:
applying a first mask to cover a first region of a polymeric optical retarder layer with a substantially uniform retardance δ for substantially normally incident light over a predetermined wavelength λ in a range from about 400 nm to about 1000 nm; reactive ion etching the surface of the polymeric optical retarder layer such that a second region thereof uncovered by the mask has an optical thickness different from the optical thickness of the first region and a retardance difference θ less than the retardance δ of the first region; and conforming the polymeric optical retarder layer to a surface of an optical component.

Embodiment 58 is the method of embodiment 57, wherein the surface of the optical component has a non-zero optical power.

Embodiment 59 is the method of embodiment 57, further comprising: applying a second mask to cover the first region and a third region comprising a portion of the second region; further reactive ion etching the surface such that the third region uncovered by the second mask is etched and has an optical thickness different from the optical thicknesses of the first region and the second region, and the third region has a retardance less than the retardance of the second region.

Embodiment 60 is the method of embodiment 57, wherein θ is less than about 0.2λ.

Embodiment 61 is the method of embodiment 57, wherein the first region is an interior region and the second region is a perimeter region substantially surrounding the interior region.

Embodiment 62 is the method of embodiment 57, wherein the first region has a first physical thickness and the second region has a second physical thickness different from the first physical thickness.

Embodiment 63 is a method for making an optical element comprising: providing a polymeric film comprising an optical surface configured to receive light at a predetermined wavelength λ in a range from about 400 nm to about 1000 nm, the optical surface defined by: a vertical axis and a horizontal axis defining four Cartesian quadrants sequentially numbered in a clockwise direction, a first longitudinal section substantially centered on the vertical axis, and a second longitudinal section substantially centered on the horizontal axis, the first and second longitudinal sections each extending across opposite edges of the optical surface, wherein the first and the second longitudinal sections each have a same substantially uniform retardance δ for substantially normally incident light; and reactive ion etching the surface of the polymeric film to form four discrete retarder sections, each retarder section disposed on a respective Cartesian quadrant of the optical surface, wherein each discrete retarder section has an optical thickness different from the optical thicknesses of the first and the second longitudinal sections and a retardance difference θ from δ greater than zero.

Embodiment 64 is the method of embodiment 63, further comprising conforming the polymeric film to a surface of an optical element, wherein the optical element has a non-zero optical power.

Embodiment 65 is a method for making an optical element comprising: providing a polymeric film comprising an optical surface configured to receive light at a predetermined wavelength λ in a range from about 400 nm to about 1000 nm, the optical surface comprising non-overlapping central and first and second edge regions disposed at or near respective first and second edges thereof, reactive ion etching the surface such that for at least one wavelength $\lambda_0$ in the wavelength range: the central region has an average retardance substantially equal to δ for substantially normally incident light, the first edge region has an average retardance substantially equal to δ+ξ, and the second edge region has an average retardance substantially equal to δ−ξ, wherein for an integer n, $\lambda_0$ (n+⅛)≤δ≤(n+½) and δ/50≤ξ≤δ/2.

Embodiment 66 is the method of embodiment 65, further comprising conforming the etched polymeric film to a surface of an optical element, wherein the optical element has a non-zero optical power.

Embodiment 67 is the method of embodiment 65, wherein n is 0.

Embodiment 68 is the method of embodiment 65, wherein for the at least one first wavelength $\lambda_0$ in the predetermined wavelength range, the central region has a substantially uniform
retardance.

Embodiment 69 is the method of embodiment 65, wherein for the at least one first wavelength $\lambda_0$ in the predetermined wavelength range, each of the first and second edge regions has a
substantially uniform retardance.

Embodiment 70 is the method of embodiment 65, wherein for the at least one first wavelength $\lambda_0$ in the predetermined wavelength range, at least one of the first and second edge regions has a varying retardance.

Embodiment 71 is the method of embodiment 65, wherein δ is substantially equal to $\lambda_0$/4 and δ/20≤ξ≤δ/5.

Embodiment 72 is the method of embodiment 65, wherein δ is substantially equal to $\lambda_0$ (n+¼) and δ/20≤ξ≤δ/5.

Embodiment 73 is the method of embodiment 65, wherein for the at least one first wavelength $\lambda_0$ in the predetermined wavelength range, the retardance of the first edge region decreases in a direction away from the first origin toward the first edge, and the retardance of the second edge region increases in a direction away from the first origin toward the second edge.

Embodiment 74 is the method of embodiment 65, wherein the optical surface further comprises third and fourth edge regions, the central region between the first and third edge regions and between the second and fourth edge regions, wherein for the at least one first wavelength $\lambda_0$ in the predetermined wavelength range, the third edge region has an average retardance substantially equal to δ−ξ, and the fourth edge region has an average retardance substantially equal to δ+ξ.

Embodiment 75 is the method of embodiment 73, wherein in a plan view, the optical surface has an area A, the central region has an area in a range from about A/10 to about 2A/3, and each of the first through fourth edge regions has an area in a range from about A/12 to about A/3.

Embodiment 76 is the method of embodiment 74, wherein for the at least one first wavelength $\lambda_0$ in the predetermined wavelength range, the central region has a substantially uniform
retardance.

Embodiment 77 is the method of embodiment 74, wherein for the at least one first wavelength $\lambda_0$ in the predetermined wavelength range, at least one of the first through fourth edge regions has a substantially uniform retardance.

Embodiment 78 is the method of embodiment 74, wherein for the at least one first wavelength $\lambda_0$ in the predetermined wavelength range, each of the first through fourth edge regions has a substantially uniform retardance.

Embodiment 79 is a method for making an optical element, the method comprising:
applying a coating over a first region of surface of a polymeric optical retarder layer, wherein the optical retarder layer has a substantially uniform retardance δ for substantially normally incident light over a predetermined wavelength l in a range from about 400 nm to about 1000 nm;
reactive ion etching the first region such that the first region has a retardance over the predetermined wavelength range greater than a retardance of a second region uncoated by the coating; and conforming the polymeric optical retarder layer to a surface of an optical component, wherein the surface of the optical component has a non-zero optical power.

Embodiment 80 is the method of embodiment 79, wherein a mask is applied to cover at least a portion of one of the first and the second regions.

Various embodiments of the invention have been described. These and other embodiments are within the scope of the following claims.

The invention claimed is:

1. A patterned optical retarder comprising non-overlapping first and second regions comprising respective first and second major surfaces having different root mean square (RMS) surface roughnesses, wherein for substantially normally incident light over a wavelength (λ) range from about 400 nm to about 1000 nm, the optical retarder has different retardances and different substantially uniform thicknesses in the respective first and second regions.

2. The patterned optical retarder of claim 1 having a third region having a thickness in a range from about 0.2 microns to about 2 microns, wherein the thickness of the first region is less than the thickness of the third region by about 50 to about 500 nm, and the thickness of the second region is less than the thickness of the first region by about 20 to about 500 nm.

3. The patterned optical retarder of claim 1, wherein for a predetermined wavelength $\lambda_o$ of normally incident light in the wavelength ($\lambda$) range from about 400 nm to about 1000 nm, the difference in the optical retardance between the first and the second regions is less than about $0.5\lambda_o$.

4. The patterned optical retarder of claim 1, wherein the optical retarder comprises a single layer.

5. An optical element comprising an optical component with a patterned optical retarder thereon, the patterned optical retarder comprising non-overlapping first and second regions comprising respective first and second major surfaces having different root mean square (RMS) surface roughnesses, wherein for substantially normally incident light over a wavelength ($\lambda$) range from about 400 nm to about 1000 nm, the optical retarder has different retardances and different substantially uniform thicknesses in the respective first and second regions.

6. A method for making an optical element, the method comprising:
    in a polymeric optical retarder layer with a substantially uniform retardance $\delta$ for substantially normally incident light over a predetermined wavelength $\lambda$ from about 400 nm to about 1000 nm and comprising a surface, etching at least first and second regions of the surface such that the polymeric optical retarder layer comprises different first and second non-zero retardance differences from $\delta$ in the respective first and second regions and comprises different substantially uniform first and second thicknesses in the respective first and second regions; and
    conforming the polymeric optical retarder layer to a surface of an optical component.

* * * * *